(12) United States Patent
Frank

(10) Patent No.: US 10,148,327 B2
(45) Date of Patent: Dec. 4, 2018

(54) METHOD AND APPARATUS FOR CHANNEL DETERMINATION FOR TIME DIVISION DUPLEX SYSTEMS WITH COUPLED ANTENNAS

(71) Applicant: MOTOROLA MOBILITY LLC, Chicago, IL (US)

(72) Inventor: Colin Frank, Park Ridge, IL (US)

(73) Assignee: Motorola Mobility LLC, Chicago, IL (US)

( * ) Notice: Subject to any disclaimer, the term of this patent is extended or adjusted under 35 U.S.C. 154(b) by 51 days.

(21) Appl. No.: 14/933,459

(22) Filed: Nov. 5, 2015

(65) Prior Publication Data

US 2017/0134077 A1 May 11, 2017

(51) Int. Cl.
*H04B 7/04* (2017.01)
*H04L 5/00* (2006.01)
(Continued)

(52) U.S. Cl.
CPC ......... *H04B 7/0456* (2013.01); *H04B 7/0417* (2013.01); *H04B 7/0426* (2013.01);
(Continued)

(58) Field of Classification Search
CPC .. H04B 7/0456; H04B 7/0617; H04B 7/0619; H04B 7/0634; H04B 7/0639;
(Continued)

(56) References Cited

U.S. PATENT DOCUMENTS

2009/0304104 A1* 12/2009 Le Saux ............. H04B 7/0434
375/267
2011/0051828 A1* 3/2011 Kent ................... H04B 7/0417
375/260
(Continued)

FOREIGN PATENT DOCUMENTS

CN          103249080 A     8/2013
CN    WO 2014032271 A1 *   3/2014 ............. H04B 17/12
(Continued)

OTHER PUBLICATIONS

International Search Report for PCT/US2016/058488, dated May 11, 2017.*
(Continued)

*Primary Examiner* — Benjamin H Elliott, IV
(74) *Attorney, Agent, or Firm* — Matthew C. Loppnow; The Watson I.P. Group, PLC

(57) ABSTRACT

A method and apparatus for channel determination for time division duplex systems with coupled antennas. A signal can be received at a receiving device. The signal can be based on a first product of an inverse of a transmit coupling matrix of a transmitting device and a receive coupling matrix of the transmitting device. A second product of a transmit coupling matrix of the receiving device and an inverse of a receive coupling matrix of the receiving device can be calculated. A receive channel from the transmitting device to the receiving device using reference symbols transmitted by the transmitting device can be measured at the receiving device. A reverse channel can be determined based on the signal and
(Continued)

based on a third product of the second product and the transpose of the measurement of the receive channel. A precoded signal based on the reverse channel can be transmitted.

29 Claims, 7 Drawing Sheets

(51) Int. Cl.
  *H04B 7/0456* (2017.01)
  *H04B 7/0417* (2017.01)
  *H04B 7/0426* (2017.01)
  *H04B 7/06* (2006.01)
  *H04L 5/14* (2006.01)

(52) U.S. Cl.
  CPC ......... *H04B 7/0465* (2013.01); *H04B 7/0469* (2013.01); *H04B 7/0473* (2013.01); *H04B 7/0617* (2013.01); *H04L 5/0048* (2013.01); *H04L 5/14* (2013.01)

(58) Field of Classification Search
  CPC ............ H04B 7/0663; H04L 25/03898; H04L 25/0391; H04L 49/101
  See application file for complete search history.

(56) References Cited

U.S. PATENT DOCUMENTS

| | | | | |
|---|---|---|---|---|
| 2011/0187474 A1* | 8/2011 | Broyde | ................. | H04B 3/487 333/2 |
| 2012/0176928 A1* | 7/2012 | Wallace | ............... | H04B 7/0421 370/252 |
| 2014/0219373 A1* | 8/2014 | Mobasher | ............ | H01Q 3/2605 375/267 |
| 2014/0348253 A1* | 11/2014 | Mobasher | ............ | H04B 7/0452 375/267 |
| 2015/0249488 A1* | 9/2015 | Wu | ........................ | H01Q 21/00 375/267 |
| 2017/0134077 A1* | 5/2017 | Frank | ................... | H04B 7/0456 |

FOREIGN PATENT DOCUMENTS

| | | | | |
|---|---|---|---|---|
| EP | 2448137 A1 | 5/2012 | | |
| FR | EP 2448137 A1 * | 5/2012 | ........... | H04B 7/0434 |
| WO | WO 2017078957 A1 * | 5/2017 | ........... | H04B 7/0456 |

OTHER PUBLICATIONS

J. Wallace, M. Jensen, "Mutual Coupling in MIMO Wireless Systems: A Rigorous Network Theory Analysis," IEEE Transactions on Wireless Communications, Jul. 2004, p. 1317-1325.

H. Steyskal, J. Herd, "Mutual coupling compensation in small array antennas," IEEE Transactions on Antennas and Propagation, Dec. 1990, pp. 1971-1975.

Chehade, PCT International Search Report, International application No. PCT/US2016/058488, European Patent Office, Jan. 2, 2017, Rijswijk, NL.

\* cited by examiner

METHOD AND APPARATUS FOR CHANNEL DETERMINATION FOR TIME DIVISION DUPLEX SYSTEMS WITH COUPLED ANTENNAS

CROSS-REFERENCE TO RELATED APPLICATIONS

This application is related to an application entitled "Method and Apparatus for Equal Energy Codebooks for Antenna Arrays with Mutual Coupling," U.S. application Ser. No. 14/855,693, filed on Sep. 16, 2015, and commonly assigned to the assignee of the present application, which is hereby incorporated by reference in its entirety.

BACKGROUND

1. Field

The present disclosure is directed to a method and apparatus for channel determination for time division duplex systems with coupled antennas.

2. Introduction

Presently, wireless communication devices communicate with other communication devices using wireless signals. Many wireless communication devices have multiple antennas that can transmit more focused signals to a receiving device using antenna beamforming. It is generally assumed that Time Division Duplex (TDD) systems have an advantage over Frequency Division Duplex (FDD) systems in that adaptive transmit beamforming can be implemented without feedback from the receiver by exploiting channel reciprocity. Generally speaking, if channel reciprocity holds, then the channel observed at the j-th User Equipment (UE) antenna when transmitting from the i-th base station, such as an enhanced NodeB (eNB), antenna is the same as the channel observed at the i-th eNB antenna when transmitting from the j-th UE antenna. Thus, if reciprocity holds, the matrix channel observed at the UE when transmitting from the eNB, $H_{eNB \to UE}$, and the matrix channel observed at the eNB when transmitting from the UE, $H_{UE \to eNB}$, have the relation $$H_{UE \to eNB} = H_{eNB \to UE}^T.$$

If the eNB has M antenna and the UE has N antennas, then the matrix $H_{eNB \to UE}$ has dimension M×N, and $H_{UE \to eNB}$ has dimension N×M.

An issue that has not been considered is that when there is coupling within the antenna array, the channel between the eNB and the UE can be a function of both the circuits used to drive the transmit array and the impedances used to load the receive array. Thus, there is a need for a method and apparatus for channel determination for time division duplex systems with coupled antennas.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

Embodiments provide a method and apparatus for channel determination for time division duplex systems with coupled antennas. According to a possible embodiment, a signal can be received at a receiving device. The signal can be based on a first product of an inverse of a transmit coupling matrix of a transmitting device and a receive coupling matrix of the transmitting device. A second product of a transmit coupling matrix of the receiving device and an inverse of a receive coupling matrix of the receiving device can be calculated. A receive channel from the transmitting device to the receiving device using reference symbols transmitted by the transmitting device can be measured at the receiving device. A reverse channel can be determined based on the signal and based on a third product of the second product and the transpose of the measurement of the receive channel. A precoded signal based on the reverse channel can be transmitted.

Figure 1:
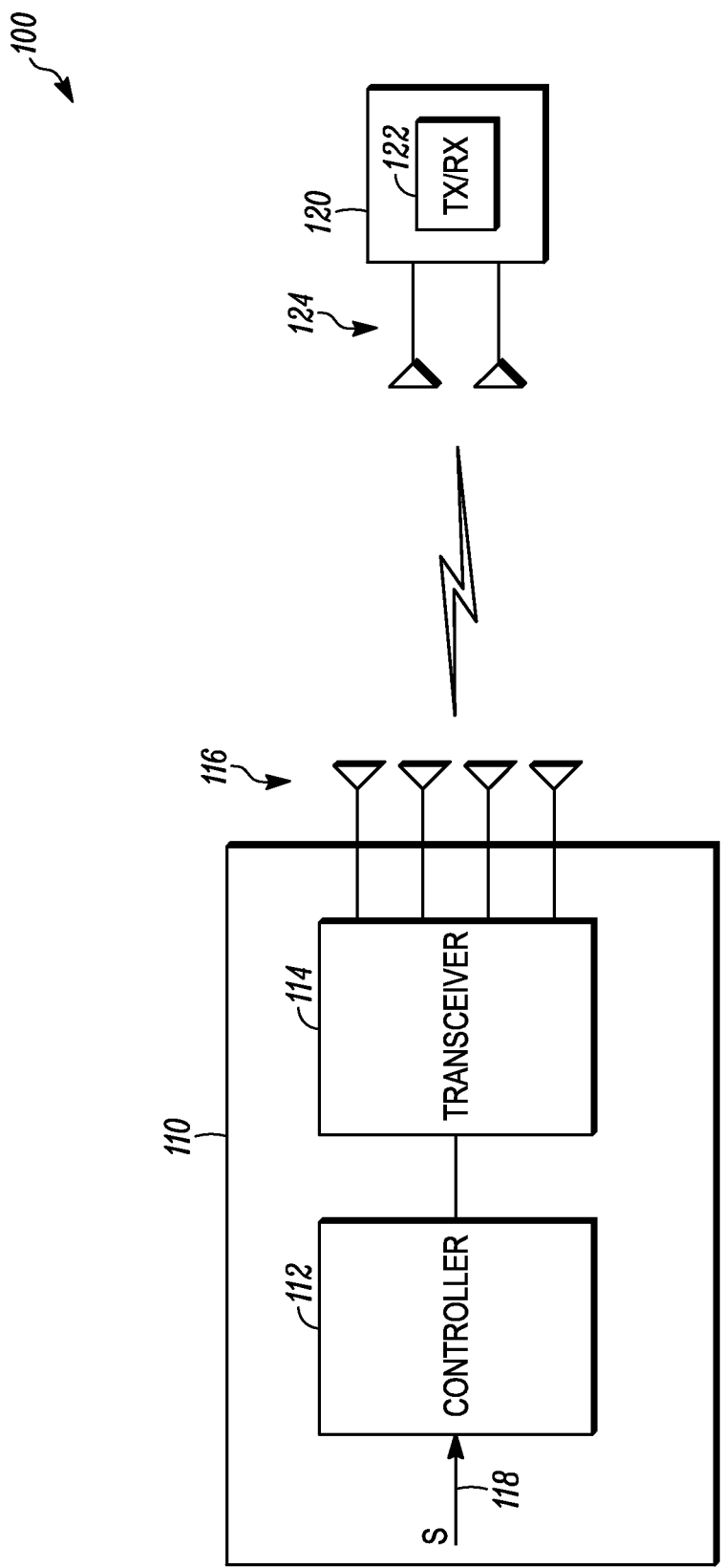
FIG. 1 is an example block diagram of a system according to a possible embodiment.

FIG. 1 is an example block diagram of a system 100 according to a possible embodiment. The system 100 can include a receiving device 110 and a transmitting device 120. The receiving device 110 can be a User Equipment (UE), a base station, an access point, or any other device that can transmit wireless signals. Similarly, the transmitting device 120 can be a UE, a base station, an access point, or any other device that can receive wireless signals. A UE can be a wireless terminal, a portable wireless communication device, a smartphone, a cellular telephone, a flip phone, a personal digital assistant, a device having a subscriber identity module, a personal computer, a selective call receiver, a tablet computer, a laptop computer, or any other device that is capable of sending and receiving wireless communication signals.

The receiving device 110 can include a controller 112, a transceiver 114, and an antenna array 116, such as a plurality of antennas, as well as other operational elements. The controller 112 can be one element or can be distributed between different elements. For example, the controller 112 can be part of a processor, can be part of a transceiver, can be part of a precoder, can be part of other elements in a transmitting device, and/or can be distributed between combinations of elements in a transmitting device and/or over cloud computing. The transmitting device 120 can include a transceiver 122 and an antenna array 124, as well as other operational elements. The transceivers 114 and 122 can each include a transmitter, a receiver, and/or more than one transceiver including transmitters and receivers.

In operation, the transceiver 114 can receive a signal based on a first product of an inverse transpose of a transmit coupling matrix of the transmitting device 120 and a transpose of a receive coupling matrix of the transmitting device

120. The controller 112 can calculate a second product of a transmit coupling matrix of the receiving device 110 and an inverse of a receive coupling matrix of the receiving device 110. The controller 112 can measure a receive channel from the transmitting device 120 to the receiving device 110 using reference symbols transmitted by the transmitting device 120. The controller 112 can determine a reverse channel based on the signal and based on a third product of the second product and the measurement of the receive channel. The controller 112 can receive a signal 118 for transmission and the transceiver 114 can transmit a precoded signal based on the reverse channel and based on the signal 118.

For calibration without antenna coupling, in previous systems, one problem with exploiting channel reciprocity is that there may be gain and phase imbalances between the signal paths from the transceivers to the antenna array and the signal paths from the antenna array to the transceiver. These gain and phase imbalances should be calibrated and compensated in order to optimally implement transmit beamforming, or in the case the receiver has multiple antennas, to maximize the capacity of MIMO transmission. In general, this calibration and compensation should be updated periodically as the phase and gain imbalances will vary over time due to temperature variation, aging, and other factors.

For the receiving device 110, such as a UE, let $D_{Tx\_UE}$ denote a diagonal matrix of dimension N×N with diagonal elements equal to the gain and phase of the signal path from each UE baseband transmitter to its corresponding antenna, and let $D_{Rx\_UE}$ denote a diagonal matrix of dimension N×N with diagonal elements equal to the gain and phase of the signal path from each UE receive antenna element to the UE baseband receiver. The matrices $D_{Tx\_eNB}$ and $D_{Rx\_eNB}$ are similarly defined for the transmitting device 122, such as an eNB, and have dimension M×M.

Under the assumption of channel reciprocity, the channel measured by the UE (using reference symbol transmissions from the eNB) can have a dimension M×N and can be given by $$Y_1 = D_{Tx\_eNB} H_{eNB \to UE} D_{Rx\_UE}$$

while the channel measured by the eNB (using reference symbol transmissions from the UE) can have a dimension N×M and can be given by $$Y_2 = D_{Tx\_UE} H_{eNB \to UE} D_{Rx\_eNB}$$

In order for reciprocity to be maintained at the eNB, the eNB should be calibrated so that $$D_{Tx\_eNB} = D_{Rx\_eNB}$$

With this requirement, the impairments from the antenna to the baseband receiver can be the same as from the baseband transmitter to the antenna. Similarly, for reciprocity to be maintained at the UE, the UE should be calibrated so that $$D_{Tx\_UE} = D_{Rx\_UE}.$$

A slightly more relaxed calibration condition allows for a common phase offset between the transmitter and receiver so that $$D_{Tx\_eNB} = \exp(j\theta_{eNB}) \cdot D_{Rx\_eNB}$$

$$D_{Tx\_UE} = \exp(j\theta_{UE}) \cdot D_{Rx\_UE}$$

This more relaxed calibration is still sufficient since a single phase rotation common to all signal paths does not affect either the capacity of the channel or the optimality of any precoder applied at the transmitter.

There are generally two ways that calibration can be implemented. A first calibration method can use active calibration internal to the device. Generally, this can be implemented in two steps. In the first step, the signal received at each antenna element from its transceiver can be coupled (with a known coupling coefficient) into a single common return path (with known gain and phase) to a receiver which can then determine the gain and phase of each transmit signal path. These gains and phases can be compensated in the baseband transmitter. In the second step, the signal from a single common transmitter (with known gain and phase) can be coupled (with a known coupling coefficient) into the signal path from each array element down to its corresponding transceiver. Given the common signal source, the gain and phase of the signal paths from the antenna elements down to the transceivers can be measured and compensated when measuring the channel.

A second calibration method can use active calibration using receiver feedback. This method can require that the device providing the feedback be calibrated, but in a slightly more restrictive sense than that given above. If the eNB is providing feedback to the UE, a requirement can be that $$D_{Tx\_eNB} = D_{Rx\_eNB} = I_{M \times M}.$$

Furthermore, it can also be a requirement that $$M \geq N$$

so that the number of antenna elements at the eNB can be greater than or equal to the number of antennas at the UE.

The calibration process can begin when the uncalibrated UE sends a full rank reference symbol transmission to the eNB. The eNB can measure the channel given by $$Y_2 = D_{Tx\_UE} H_{eNB \to UE}{}^T D_{Rx\_eNB}.$$

The calibrated eNB signals the matrix $Y_2$ to the UE. The eNB next sends a full rank reference symbol transmission to the UE. Assuming that channel reciprocity holds, the UE measures the channel $$Y_1 = D_{Tx\_eNB} H_{eNB \to UE} D_{Rx\_UE}.$$

The UE then performs the following computation $$\begin{aligned}
Z_1 &= (Y_2 Y_1)(Y_1^T Y_1)^{-1} \\
&= (D_{Tx\_UE} H_{UE \to eNB} D_{Rx\_eNB} D_{Tx\_eNB} H_{UE \to eNB}^T D_{Rx\_UE}) \cdot \\
&\quad \left((D_{Tx\_eNB} H_{UE \to eNB}^T D_{Rx\_UE})^T D_{Tx\_eNB} H_{UE \to eNB}^T D_{Rx\_UE}\right)^{-1} \\
&= (D_{Tx\_UE} H_{UE \to eNB} D_{Rx\_eNB} D_{Tx\_eNB} H_{UE \to eNB}^T D_{Rx\_UE}) \cdot \\
&\quad (D_{Rx\_UE} H_{UE \to eNB} D_{Tx\_eNB} D_{Tx\_eNB} H_{UE \to eNB}^T D_{Rx\_UE})^{-1} \\
&= D_{Tx\_UE}(H_{UE \to eNB} H_{UE \to eNB}^T) D_{Rx\_UE} \cdot \\
&\quad (D_{Rx\_UE}(H_{UE \to eNB} H_{UE \to eNB}^T) D_{Rx\_UE})^{-1} \\
&= D_{Tx\_UE}(H_{UE \to eNB} H_{UE \to eNB}^T) D_{Rx\_UE} \cdot \\
&\quad D_{Rx\_UE}^{-1}(H_{UE \to eNB} H_{UE \to eNB}^T)^{-1} D_{Rx\_UE}^{-1} \\
&= D_{Tx\_UE} D_{Rx\_UE}^{-1}.
\end{aligned}$$

Note that the number of eNB antennas, M, should be greater than or equal to the number of UE antennas, N, in order for the matrices $$Y_1^T Y_1 \text{ and } H_{UE \to eNB} H_{UE \to eNB}^T$$

to have full rank, and so be invertible. Alternatively, the UE can perform the computation $$Z_2 = (Y_1^T Y_2^T)(Y_2 Y_2^T)^{-1}$$

$$= \left((D_{Tx\_eNB} H_{UE \to eNB}^T D_{Rx\_UE})^T (D_{Tx\_UE} H_{UE \to eNB} D_{Rx\_eNB})^T\right) \cdot$$

$$(D_{Tx\_UE} H_{UE \to eNB} D_{Rx\_eNB} (D_{Tx\_UE} H_{UE \to eNB} D_{Rx\_eNB})^T)^{-1}$$

$$= (D_{Rx\_UE} H_{UE \to eNB} D_{Tx\_eNB} D_{Rx\_eNB} H_{UE \to eNB}^T D_{Tx\_UE}) \cdot$$

$$(D_{Tx\_UE} H_{UE \to eNB} D_{Rx\_eNB} D_{Rx\_eNB} H_{UE \to eNB}^T D_{Tx\_UE})^{-1}$$

$$= D_{Rx\_UE} (H_{UE \to eNB} H_{UE \to eNB}^T) D_{Tx\_UE} \cdot$$

$$(D_{Tx\_UE} (H_{UE \to eNB} H_{UE \to eNB}^T) D_{Tx\_UE})^{-1}$$

$$= D_{Rx\_UE} (H_{UE \to eNB} H_{UE \to eNB}^T) D_{Tx\_UE} \cdot$$

$$D_{Tx\_UE}^{-1} (H_{UE \to eNB} H_{UE \to eNB}^T)^{-1} D_{Tx\_UE}^{-1}$$

$$= D_{Rx\_UE} D_{Tx\_UE}^{-1}.$$

Given the diagonal matrix $Z_1 = D_{Tx\_UE} D_{Rx\_UE}^{-1}$, the UE can calibrate the transmitter to match its receiver by multiplication of the transmitter baseband vector input by $Z_1^{-1}$. Specifically, if the vector x denotes the baseband input to the transmitter, then the vector input to the UE antenna elements can be given by $$x^T Z_1^{-1} D_{Tx\_UE} = x^T (D_{Tx\_UE} D_{Rx\_UE}^{-1})^{-1} D_{Tx\_UE}$$

$$= x^T D_{Rx\_UE} D_{Tx\_UE}^{-1} D_{Tx\_UE}$$

$$= x^T D_{Rx\_UE}$$

so that the UE array can be calibrated in the sense that the transmit and receive impairments are equal. Alternatively, the transmitter baseband vector input can be multiplied by $Z_2$ with the result that $$x^T Z_2 D_{Tx\_UE} = x^T D_{Rx\_UE} D_{Tx\_UE}^{-1} D_{Tx\_UE}$$

$$= x^T D_{Rx\_UE}$$

so that again the UE can be calibrated in the sense that its transmit and receive impairments are equal.

For reverse channel determination in the absence of mutual antenna coupling, a reverse channel can be determined in several ways. The requirement which should be satisfied can be that $$D_{Tx\_eNB} H_{eNB \to UE} D_{Rx\_UE} = (D_{Tx\_UE} H_{UE \to eNB} D_{Rx\_eNB})^T$$

$$= D_{Rx\_eNB}^T H_{UE \to eNB}^T D_{Tx\_UE}^T$$

$$= D_{Rx\_eNB} H_{eNB \to UE} D_{Tx\_UE}.$$

This can be achieved in any one of three ways.

For a first method of reverse channel determination, the eNB and the UE can self-calibrate so that $$D_{Tx\_eNB} = D_{Rx\_eNB} \text{ and } D_{Tx\_UE} = D_{Rx\_UE}.$$

At the eNB, transmit calibration can be implemented at baseband by multiplying the transmit baseband vector input by $D_{Tx\_eNB}^-$, and receive calibration can be implemented by multiplying the received baseband signal by $D_{Rx\_eNB}^{-1}$. However, this approach reduces the capacity of the channel from the UE to the eNB since multiplication of the receive signal by $D_{Rx\_eNB}^{-1}$ will cause the receiver noise power to be unequal across the M receive paths (unless the impairments are phase only). Without knowledge of this noise variation, the UE cannot fully optimize the transmit precoder for the UE to eNB link to maximize capacity. Alternatively, the eNB can implement both transmit and receive calibration by multiplying the transmit baseband vector input by $D_{Rx\_eNB} D_{Tx\_eNB}^{-1}$ so that the transmit impairment becomes $D_{Rx\_eNB}$. With this calibration method, the transmit power per antenna will vary even if the power of the baseband inputs is equal. However, since the eNB knows $D_{Rx\_eNB}$, the eNB precoder can take this variation into account when choosing the precoder to optimize capacity. Alternatively, the eNB can multiply the transmit baseband vector input by $D_{Rx\_eNB} D_{Tx\_eNB}^{-1}$ only when reference symbols are transmitted, and otherwise leave the baseband input unchanged. These same two approaches can be used for the UE to eNB link.

For a second method of reverse channel determination, as above, it is assumed that M≥N, so that the eNB has at least as many antennas as the UE. Furthermore, the eNB self calibrates so that $$D_{Tx\_eNB} = D_{Rx\_eNB} = I_{M \times M}.$$

The UE sends full rank reference symbols to the eNB from which the eNB measures $$Y_2 D_{Tx\_UE} H_{eNB \to UE}^T D_{Rx\_eNB}$$

The eNB signals this measurement to the UE. The eNB sends full rank reference symbols to UE from which the UE measures $$Y_1 = D_{Tx\_eNB} H_{eNB \to UE} D_{Rx\_UE}$$

The UE uses the measurements $Y_1$ and $Y_2$ to compute $D_{Tx\_UE} D_{Rx\_UE}^{-1}$, as indicated above. The UE then multiplies the output of the baseband transmitter by $D_{Tx\_UE} D_{Rx\_UE}^{-1}$ with the result that the input to the UE array is given by $$x^T (D_{Rx\_UE} D_{Tx\_UE}^{-1}) D_{Tx\_UE} = x^T D_{Rx\_UE},$$

so that the UE transmit and receive impairments are equal. Finally, since the transmit and receive impairments are equal both at the UE and the eNB, the condition for channel reciprocity is now satisfied, so that the channel from the eNB to the UE is the transpose of the channel from the UE to the eNB.

For a third method of reverse channel determination, it is assumed that the eNB can measure both $D_{Tx\_eNB}$ and $D_{Rx\_eNB}$. Similarly, it is assumed that the UE can measure both $D_{Tx\_UE}$ and $D_{Rx\_UE}$. The eNB signals $$D_{Tx\_eNB}^{-1} D_{Rx\_eNB}$$

to the UE. The eNB transmits full rank reference symbols to the UE which allows the UE to measure the channel $$Y_1 = D_{Tx\_eNB} H_{eNB \to UE} D_{Rx\_UE}.$$

The UE then computes the channel from the eNB to the UE as $$(D_{Tx\_UE} D_{Rx\_UE}^{-1}) Y_1^T ((D_{Tx\_eNB})^{-1} D_{Rx\_eNB}) = D_{Tx\_UE} D_{Rx\_UE}^{-1} D_{Rx\_UE} (H_{eNB \to UE})^T$$

$$D_{Tx\_eNB} (D_{Tx\_eNB})^{-1} D_{Rx\_eNB}$$

$$= D_{Tx\_UE} (H_{eNB \to UE})^T D_{Rx\_eNB},$$

which is the channel from the UE to the eNB. Similarly, the UE signals $$(D_{Tx\_UE})^{-1}D_{Rx\_UE}$$

to the eNB. The UE transmits full rank reference symbols to the eNB which allows the eNB to measure the channel $$Y_2 = D_{Tx\_UE}H_{eNB \to UE}{}^T D_{Rx\_eNB}.$$

The eNB then computes the channel from the eNB to the UE as $$(D_{Tx\_eNB}D_{Rx\_eNB}^{-1})Y_2^T(D_{Tx\_UE}^{-1}D_{Rx\_UE}) = D_{Tx\_eNB}D_{Rx\_eNB}^{-1}D_{Rx\_eNB}H_{eNB \to UE}$$

$$D_{Tx\_UE}D_{Tx\_UE}^{-1}D_{Rx\_UE}$$

$$= D_{Tx\_eNB}H_{eNB \to UE}D_{Rx\_UE},$$

which is the channel from the eNB to the UE.

It should be noted that this last method may be preferable to the second for two reasons. First, equalizing the transmit and receive impairments may have the effect of degrading both links by application of equalizing attenuations. Secondly, in the second method, a full-rank N×M matrix should be signaled from the eNB to the UE, which requires signaling M·N coefficients. In this third method, the two matrices which should be signaled are diagonal, so the matrix signaled from the eNB to the UE has M coefficients, while the matrix signaled from the UE to the eNB has N coefficients.

For mutual coupling impact on TDD calibration an issue that has not been considered is that when there is coupling within the antenna array, the channel between the eNB and the UE can be a function of both the circuits used to drive the transmit array and the impedances used to load the receive array. In particular, the condition that the signal paths to and from the arrays are gain and phase matched so that $$D_{Tx\_eNB} = D_{Rx\_eNB} \text{ and } D_{Tx\_UE} = D_{Rx\_UE},$$

or even the stronger condition that $$D_{Tx\_eNB} = D_{Rx\_eNB} = I_{M \times M} \text{ and } D_{Tx\_UE} = D_{Rx\_UE} = I_{M \times M},$$

is not sufficient to ensure that a channel measurement taken at the UE of the of the channel from the eNB to the UE is equal to the transpose of the channel measurement taken at the eNB of UE to the eNB. In particular, we will distinguish between the propagation channel between the transmit and receive elements in isolation, and the channel that is measured with the effect of mutual coupling.

Some care should be taken in the definition of the "channel" between a particular pair of antenna arrays. In general, the channel observed between the i-th element of the eNB array and the j-th element of the UE array can depend on all of the following: (i) the propagation channel between the i-th element of the eNB array and the j-th element of the UE antenna array; (ii) the antenna pattern of i-th element of the eNB array; and (iii) the antenna pattern of the j-th element of the UE array.

When there is mutual coupling between the antenna elements of the the transmit and/or receive array, the problem of defining the channel between the i-th transmit antenna and the j-th receive antenna becomes much more complicated. With mutual coupling at the transmitter antenna array, a reference symbol sent from the i-th transmit antenna will couple into, and thus be transmitted from, the adjacent antennas. Similarly, with mutual coupling at the receiver antenna array, the reference symbol received at the j-th receive antenna will couple into the adjacent antennas and contribute to the reference symbol measurement at the adjacent antennas. Furthermore, at both the transmitter and the receiver, the degree of coupling will depend not only on the mutual coupling between the antenna elements, but also on the circuits used to drive the transmitter and the impedances used to load the receiver.

As before, we use $$H_{eNB \to UE;i,j}$$

to denote the channel from the i-th eNB antenna to the j-th UE antenna, with the restriction that this is the channel observed at the UE when all antennas other than the i-th eNB antenna are open circuit and the elements of the UE antenna array are open circuit. The channel is measured by transmitting a known reference symbol from the i-th eNB antenna and measuring the reference symbol at the j-th antenna of the UE array. As defined here, the channel is only a function of (i), (ii), and (iii) above. That is, $H_{eNB \to UE;i,j}$ is only a function of the propagation channel between the i-th element of the eNB and the j-th element of the UE, and of the antenna patterns of these two antenna elements.

Figure 2:
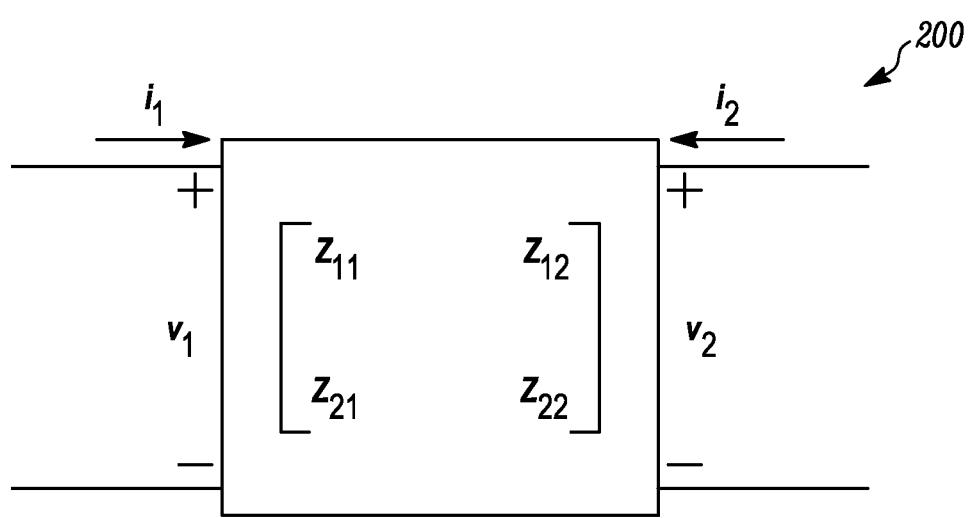
FIG. 2 is an example illustration of a two-port model for a two-element array according to a possible embodiment.

FIG. 2 is an example illustration of a two-port model 200 for a two-element array according to a possible embodiment. The two ports can correspond to two antennas in an antenna array. An M-port circuit can be used to model the vector voltage-current relationship for the M-ports of the M-element antenna array, which can be given by $$V = ZI,$$

where Z can be the M×M impedance matrix for the array. In the two port model 200, $i_1$ and $v_1$ denote the current and voltage for the first antenna, while $i_2$ and $v_2$ denote the current and voltage for the second antenna.

Figure 3:
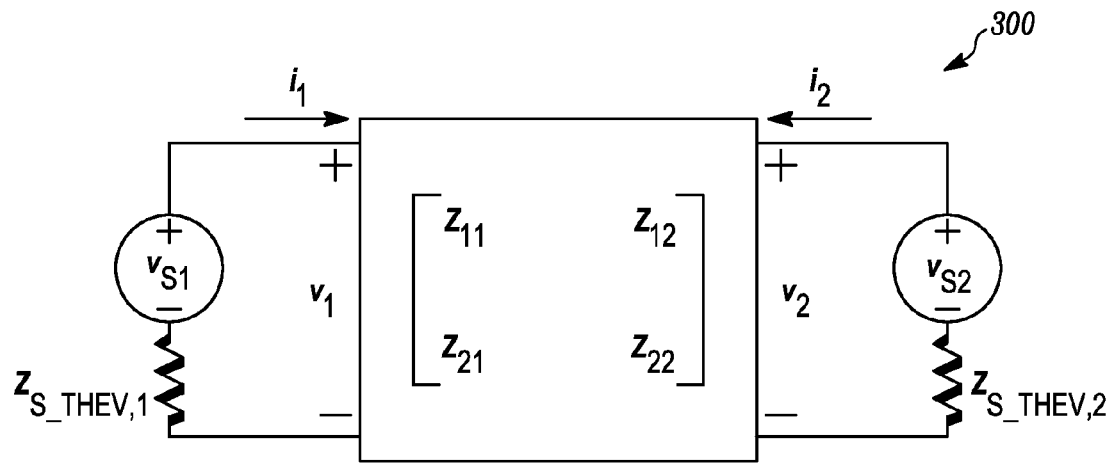
FIG. 3 is an example illustration of a Thevenin source model according to a possible embodiment.
Figure 4:
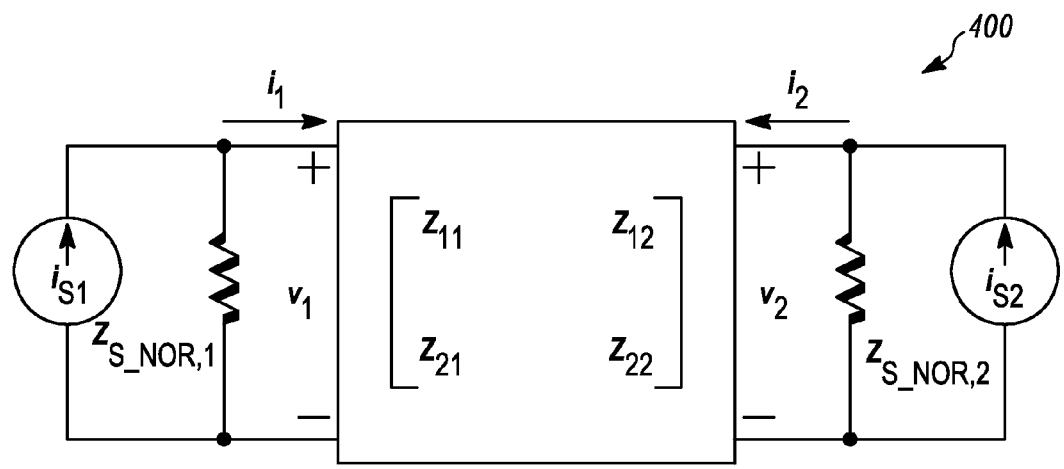
FIG. 4 is an example illustration of a Norton source model according to a possible embodiment.

FIG. 3 is an example illustration of a Thevenin source model 300 according to a possible embodiment. FIG. 4 is an example illustration of a Norton source model 400 according to a possible embodiment. The two linear source models 300 and 400 can be considered for driving an antenna array. The Thevenin source model 300 can include ideal voltage sources $v_s$ in combination with series impedances $Z_{S\_Thev}$, while the Norton source model 400 can include an ideal current source $i_s$ in combination with a parallel shunt impedance $Z_{S\_Nor}$.

When there is coupling between the antenna elements of the array, a symbol input to one element of the transmit array will couple into the other elements, and the degree of coupling will depend on the circuits used to drive the array. For example, the coupling of the transmitted symbol into adjacent elements will depend both on the mutual coupling of the antenna elements and on the source impedance associated with the Norton or Thevenin source used to drive each element of the array. Similarly, for a symbol arriving at the j-th element of the receive array, the degree to which the symbol couples into the other elements of the receive array is a function of both the mutual coupling of the antenna elements and of the impedances used to load the receive antenna array elements.

For antenna coupling at the transmit array, we first consider the impact of antenna coupling in the M×1 eNB array on the element transmit patterns and on the channel observed at the UE array as a function of the source model used to drive the eNB array. We consider an antenna array with impedance matrix $Z_{eNB}$, though more generally, an M-port model can be used to analyze an M-element array. The diagonal source impedance matrix for the Thevenin source is denoted as $Z_{eNB\_Thev}$, and the diagonal source impedance for the Norton source model is denoted as $Z_{eNB\_Nor}$. The vector $p(\theta, \varphi)$ denotes the vector of antenna patterns for the M antenna elements of the eNB array when each element is measured when the other elements are open circuit. Thus, $p_i(\theta, \varphi)$ is the antenna pattern for the i-th element of the eNB array when all of the other antenna elements in the eNB array are open circuit.

For a Thevenin source model with driving voltage $v_S$ and source impedance $Z_{eNB\_Thev}$, the far field antenna pattern can be shown to be given by $$v_S^T(Z_{eNB\_Thev}+Z_{eNB})^{-1}p(\theta,\varphi).$$

For a Norton source model with driving current $i_S$ and shunt impedance $Z_{eNB\_Nor}$, the far-field antenna pattern is given by $$i_S^T(Z_{eNB\_Nor}^{-1}+Z_{eNB}^{-1})^{-1}Z_{eNB}^{-1}p(\theta,\varphi).$$

Since the antenna pattern corresponding to a particular antenna precoder depends on whether the precoder is implemented as a voltage source or as a current source, the signal observed at the j-th element of the UE array also depends on the source model used. An interesting question to consider is whether or not the channel observed at the j-th element of the UE array with one source model used to drive the eNB array can be determined from the channel observed with a different source model, and furthermore, whether this transformation can be determined using only the impedance parameters for the array and without knowledge of the antenna element patterns. Let the 1×N row vector $F_{eNB \to UE;k,\cdot}^{Thev}(Z_{eNB\_Thev})$ given by $$F_{eNB \to UE;k,\cdot}^{Thev}(Z_{eNB\_Thev}) = [F_{eNB \to UE;k,1}^{Thev}(Z_{eNB\_Thev}) \, F_{eNB \to UE;k,2}^{Thev}(Z_{eNB\_Thev}) \ldots F_{eNB \to UE;k,N}^{Thev}(Z_{eNB\_Thev})]$$

denote the vector channel observed at the UE antenna array when the elements of the UE antenna array are open circuit and the eNB transmit array is driven by a Thevenin source with voltage source vector $$v_k = [\underbrace{0 \ldots 0}_{k-1} 1 0 \ldots 0]^T$$

and series impedance $Z_{eNB\_Thev}$. Though the observed channel $F_{eNB \to UE;k,\cdot}^{Thev}(Z_{eNB\_Thev})$ also depends on the impedance matrix of the of the eNB antenna array, $Z_{eNB}$, this dependence has been suppressed in the notation, as $Z_{eNB}$ is a function of the eNB antenna array only, and is assumed to be fixed. Similarly, let the 1×N vector $F_{eNB \to UE;k,\cdot}^{Nor}(Z_{eNB\_Nor})$ given by $$F_{eNB \to UE;k,\cdot}^{Nor}(Z_{eNB\_Nor}) = [F_{eNB \to UE;k,1}^{Nor}(Z_{eNB\_Nor}) \, F_{eNB \to UE;k,2}^{Nor}(Z_{eNB\_Nor}) \ldots F_{eNB \to UE;k,N}^{Nor}(Z_{eNB\_Nor})]$$

denote the vector channel observed at the UE antenna array when the elements of the UE antenna array are open circuit and when the eNB transmit array is driven by a Norton source with current source vector $$i_k = [\underbrace{0 \ldots 0}_{k-1} 1 0 \ldots 0]^T$$

and shunt impedance $Z_{eNB\_Nor}$. Again, the dependence of $F_{eNB \to UE;k,\cdot}^{Nor}(Z_{eNB\_Nor})$ on the impedance matrix of the antenna array, $Z_{eNB}$, has been suppressed in the notation. We now consider the relationship between the channels $F_{eNB \to UE;k,\cdot}^{Thev}(Z_{eNB\_Thev})$ and $F_{eNB \to UE;k,\cdot}(Z_{eNB\_Nor})$, and the channel $H_{eNB \to UE;i,j}$, which was defined previously as the channel from the i-th eNB antenna to the j-th UE antenna when the elements of the UE antenna array are open circuit and all eNB elements other than the i-th element are open circuit. From the definition of $H_{eNB \to UE;i,j}$, it follows that the antenna pattern $$p_i(\theta,\varphi)$$

of the i-th element of the eNB array yields the channel observation $H_{eNB \to UE;i,j}$ at the j-th UE antenna. This observation can be expressed as $$p_i(\theta,\varphi) \to H_{eNB \to UE;i,\cdot}$$

where $$H_{eNB \to UE;i,\cdot}=[H_{eNB \to UE;i,1} H_{eNB \to UE;i,2} \ldots H_{eNB \to UE;i,M}]$$

so that the pattern $p_i(\theta,\varphi)$ yields the observation $H_{eNB \to UE;i,\cdot}$ at the UE antenna array when the elements of the UE antenna array are open circuit. Taken over all j, $1 \leq j \leq M$, the relationship between the stacked element patterns and the stacked channel observations can be expressed as $$\begin{bmatrix} p_1(\theta,\varphi) \\ p_2(\theta,\varphi) \\ \vdots \\ p_M(\theta,\varphi) \end{bmatrix} = p(\theta,\varphi) \to \begin{bmatrix} H_{eNB \to UE;1,\cdot} \\ H_{eNB \to UE;2,\cdot} \\ \vdots \\ H_{eNB \to UE;M,\cdot} \end{bmatrix} = H_{eNB \to UE}.$$

For an eNB transmit array driven by a Thevenin source with series impedance $Z_{eNB\_Thev}$ the antenna pattern corresponding to the precoder $v_k$ is given by $$v_k^T(Z_{eNB\_Thev}+Z_{eNB})^{-1}p(\theta,\varphi).$$

Since the row vector $F_{eNB \to UE;k,\cdot}^{Thev}(Z_{eNB\_Thev})$ is used to denote the vector channel observed at at the UE antenna array when the elements of the UE antenna array are open circuit and when the eNB transmit array is driven by a Thevenin source with voltage source vector $v_k$, it follows that $$v_k^T(Z_{eNB\_Thev}+Z_{eNB})^{-1}p(\theta,\varphi) \to F_{eNB \to UE;k,\cdot}(Z_{eNB\_Thev}).$$

Furthermore, since the vector $v_k$ was defined previously as $$v_k = [\underbrace{0 \ldots 0}_{k-1} 1 0 \ldots 0]^T,$$

the vector of antenna patterns corresponding to the precoders $\{v_1, v_2, \ldots v_N\}$ can be expressed as $$[v_1 v_2 \ldots v_N]^T(Z_{eNB\_Thev}+Z_{eNB})^{-1}p(\theta,\varphi) = I_{M \times M}(Z_{eNB\_Thev}+Z_{eNB})^{-1}p(\theta,\varphi)$$

$$= (Z_{eNB\_Thev}+Z_{eNB})^{-1}p(\theta,\varphi),$$

and the relationship between this vector of antenna patterns and the channel vectors observed at the UE antenna array when the elements of the UE antenna array are open circuit is given by $$(Z_{eNB\_Thev}+Z_{eNB})^{-1}p(\theta,\varphi) \to F_{eNB \to UE}^{Thev}(Z_{S\_Thev}).$$

Finally, since we previously defined $H_{eNB \to UE}$ such that $$p(\theta,\varphi) \to H_{eNB \to UE},$$

when the elements of the UE antenna array are open circuit, it follows from the assumed linearity of the channel with respect to the antenna patterns that $$(Z_{eNB\_Thev}+Z_{eNB})^{-1}p(\theta,\varphi) \to (Z_{eNB\_Thev}+Z_{eNB})^{-1}H_{eNB \to UE},$$

and thus it must be that $$F_{eNB \to UE}^{Thev}(Z_{eNB\_Thev})=(Z_{eNB\_Thev}+Z_{eNB})^{-1}H_{eNB \to UE}.$$

Similarly, it can be shown that the M×N matrix $H_{Nor}(Z_{S\_Nor})$ can be expressed as $$F_{eNB \to UE}^{Nor}(Z_{eNB\_Nor})=(Z_{eNB\_Nor}^{-1}+Z_{eNB}^{-1}H_{eNB \to UE}.$$

From these two expressions, it can be observed that for an eNB antenna array characterized by its vector of element patterns $p(\theta, \varphi)$, the channel observed at the UE antenna array for a given precoder depends on both: (i) whether the precoder is implemented as a Thevenin source driven by a voltage vector or a Norton source driven by a current vector; and (ii) the source impedance used.

It can also be observed that if there is no coupling between elements of the eNB antenna array, then $$Z_{eNB;i,j}=0 \; \forall i \neq j,$$

and the impedance matrix $Z_{eNB}$ is diagonal. In this case, the matrix of channel vectors observed at the UE antenna array for the Thevenin and Norton source models when the elements of the UE antenna array are open circuit are given by $$F_{eNB \to UE}^{Thev}(Z_{eNB\_Thev}) = \begin{bmatrix} (Z_{eNB\_Thev;1,1}+Z_{eNB;1,1})^{-1}H_{eNB \to UE;1;} \\ (Z_{eNB\_Thev;2,2}+Z_{eNB;2,2})^{-1}H_{eNB \to UE;2;} \\ \vdots \\ (Z_{eNB\_Thev;M,M}+Z_{eNB;M,M})^{-1}H_{eNB \to UE;M;} \end{bmatrix}$$

and $$F_{eNB \to UE}^{Nor}(Z_{eNB\_Nor}) = \begin{bmatrix} Z_{eNB\_Nor;1,1}(Z_{eNB\_Nor;1,1}+Z_{eNB;1,1})^{-1}H_{eNB \to UE;1;} \\ Z_{eNB\_Nor;1,1}(Z_{eNB\_Nor;1,1}+Z_{eNB;2,2})^{-1}H_{eNB \to UE;2;} \\ \vdots \\ Z_{eNB\_Nor;M,M}(Z_{eNB\_Nor;M,M}+Z_{eNB;M,M})^{-1}H_{eNB \to UE;M;} \end{bmatrix},$$

respectively. Thus, if there is no coupling between the elements of the eNB antenna array, and furthermore if $$Z_{eNB;i,i}=Z_{eNB;j,j}, \text{ and } Z_{eNB\_Thev;i,i}=Z_{eNB\_Thev;j,j},$$

for all $1 \leq i, j \leq M$, the channel vectors observed at the UE antenna array with a Thevenin source model driving the eNB array is the same, within a scalar constant, as the channel vector observed from each element of the eNB array when all other antenna elements of the eNB are open circuit, so that $$F_{eNB \to UE}^{Thev}(Z_{eNB\_Thev}) = \frac{1}{Z_{eNB\_Thev;1,1}+Z_{eNB;1,1}}H_{eNB \to UE}.$$

Similarly, if there is no coupling between the antennas and $$Z_{eNB;i,i}Z_{eNB;j,j} \text{ and } Z_{eNB\_Nor;i,i}=Z_{eNB\_Nor;j,j},$$

for all $1 \leq i, j \leq M$, then the channel vectors observed at the UE antenna array with a Norton source model driving the eNB array is the same, within a scalar constant, as the channel vectors observed from each element of the eNB when all other antenna elements of the eNB are open circuit, so that $$F_{eNB \to UE}^{Nor}(Z_{eNB\_Nor}) = \frac{Z_{eNB\_Nor;1,1}}{Z_{eNB\_Nor;1,1}+Z_{eNB;11}}H_{eNB \to UE}.$$

For the general case in which the antennas are coupled, the relationship between the matrices of channel vectors $F_{eNB \to UE}^{Thev}(Z_{eNB\_Thev})$ and $F_{eNB \to UE}^{Nor}(Z_{eNB\_Nor})$ observed at the UE antenna array when the elements of the UE antenna array are open circuit can be expressed as $$\begin{aligned}F_{eNB \to UE}^{Nor}(Z_{eNB\_Nor}) &= (Z_{eNB\_Nor}^{-1}+Z_{eNB}^{-1})^{-1}Z_{eNB}^{-1}H_{eNB \to UE} \\ &= (Z_{eNB\_Nor}^{-1}+Z_{eNB}^{-1})^{-1}Z_{eNB}^{-1}(Z_{eNB\_Thev}+Z_{eNB})F_{eNB \to UE}^{Thev}(Z_{eNB\_Thev}) \\ &= Z_{eNB\_Nor}(Z_{eNB\_Nor}+Z_{eNB})^{-1}Z_{eNB}Z_{eNB}^{-1}(Z_{eNB\_Thev}+Z_{eNB})F_{eNB \to UE}^{Thev}(Z_{eNB\_Thev}) \\ &= Z_{eNB\_Nor}(Z_{eNB\_Nor}+Z_{eNB})^{-1}(Z_{eNB\_Thev}+Z_{eNB})F_{eNB \to UE}^{Thev}(Z_{eNB\_Thev})\end{aligned}$$

so that $$F_{eNB \to UE}^{Nor}(Z_{eNB\_Nor}) = Z_{eNB\_Nor}(Z_{eNB\_Nor}+Z_{eNB})^{-1}(Z_{eNB_{Thev}}+Z_{eNB})F_{eNB \to UE}^{Thev}(Z_{eNB\_Thev}),$$

for the Thevenin and Norton source models, respectively. Alternatively, the relationship can be expressed as $$F_{eNB \to UE}^{Thev}(Z_{eNB\_Thev})=(Z_{eNB\_Thev}+Z_{eNB})^{-1}(Z_{eNB\_Nor}+Z_{eNB})Z_{eNB\_Nor}^{-1}F_{eNB \to UE}^{Nor}(Z_{eNB\_Nor})$$

In the event that the source impedances satisfy $Z_{eNB\_Nor}=Z_{eNB\_Thev}$, we have $$F_{eNB \to UE}^{Nor}(Z_{eNB\_Nor})=Z_{eNB\_Nor}F_{eNB \to UE}^{Thev}(Z_{eNB\_Thev}).$$

Furthermore, if the diagonal source impedance matrix has the form $$Z_{eNB\_Nor}=Z_{eNB\_Nor,1} \cdot I_{M \times M},$$

then $$F_{eNB \to UE}^{Nor}(Z_{eNB\_Nor})=Z_{eNB\_Nor,1}F_{eNB \to UE}^{Thev}(Z_{eNB\_Thev})$$

and the matrices of channel vectors observed at the UE antenna array for the two source models are equal within a scalar multiple. Finally, if the Norton and the Thevenin sources are equivalent so that $$Z_{eNB\_Nor}=Z_{eNB\_Thev}$$

and $$v_S=Z_{eNB\_Nor}i_S,$$

then the vector channel resulting from the Norton source can be expressed as $$i^T F_{eNB \to UE}^{Nor}(Z_{eNB\_Nor}) = i^T(Z_{eNB\_Nor}^{-1}+Z_{eNB}^{-1})^{-1}Z_{eNB}^{-1}H_{eNB \to UE}$$
$$= i^T(Z_{eNB\_Thev}^{-1}+Z_{eNB}^{-1})^{-1}Z_{eNB}^{-1}H_{eNB \to UE}$$
$$= i^T Z_{eNB\_Thev}(Z_{eNB\_Thev}+Z_{eNB})^{-1}Z_{nB}Z_{eNB}^{-1}H_{eNB \to UE}$$
$$= v^T(Z_{eNB\_Thev}+Z_{eNB})^{-1}H_{eNB \to UE}$$
$$= v^T F_{eNB \to UE}^{Thev}(Z_{eNB\_Thev}),$$

which is the same as the vector channel for the Thevenin equivalent source.

Finally, we consider the relationship between the vector channels for two Thevenin sources having different source impedances and between two Norton sources having different source impedances. For two Thevenin source impedances $Z_{eNB\_Thev}$ and $Z'_{eNB\_Thev}$, we have $$F_{eNB \to UE}^{Thev}(Z_{eNB\_Thev})=(Z_{eNB\_Thev}+Z_{eNB})^{-1}H_{eNB \to UE}, \text{ and}$$

$$F_{eNB \to UE}^{Thev}(Z'_{eNB\_Thev})=(Z'_{eNB\_Thev}+Z_{eNB})^{-1}H_{eNB \to UE}.$$

Solving for $H_{eNB \to UE}$ and inserting into the first equation, we have $$F_{eNB \to UE}^{Thev}(Z_{eNB\_Thev})=(Z_{eNB\_Thev}+Z_{eNB})^{-1}(Z'_{eNB\_Thev}+Z_{eNB})F_{eNB \to UE}^{Thev}(Z'_{eNB\_Thev})$$

For two Norton source impedances $Z_{eNB\_Nor}$ and $Z'_{eNB\_Nor}$, we have $$F_{eNB \to UE}^{Nor}=(Z_{eNB\_Nor})=(Z_{eNB\_Nor}^{-1}+Z_{eNB}^{-1})^{-1}Z_{eNB}^{-1}H_{eNB \to UE}, \text{ and}$$

$$F_{eNB \to UE}^{Nor}(Z'_{eNB\_Nor})=((Z'_{eNB\_Nor})^{-1}+Z_{eNB}^{-1})^{-1}Z_{eNB}^{-1}H_{eNB \to UE}.$$

Solving for $H_{eNB \to UE}$ and inserting into the first equation, we have $$F_{eNB \to UE}^{Nor}(Z_{eNB\_Nor})=(Z_{eNB\_Nor}^{-1}+Z_{eNB}^{-1})^{-1}((Z'_{eNB\_Nor})^{-1}+Z_{eNB}^{-1})F_{eNB \to UE}^{Nor}(Z'_{eNB\_Nor}).$$

Figure 5:
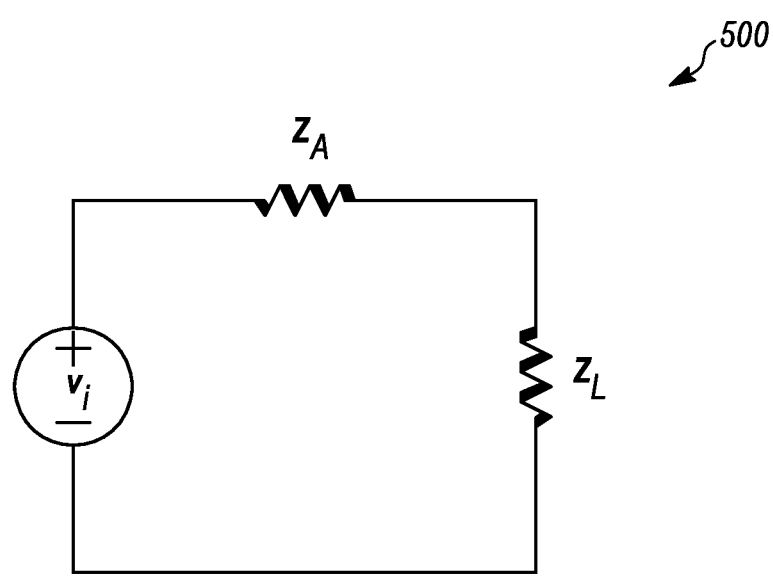
FIG. 5 is an example illustration of a circuit model for a single receive antenna according to a possible embodiment.

FIG. 5 is an example illustration of a circuit model 500 for a single receive antenna according to a possible embodiment. To this point, we have only considered the impact of antenna coupling within the transmit array on the vector channel observed at the UE antenna array when the elements of the UE array are open circuit. We now consider the impact of antenna coupling within the UE receive array on the channel measured by the UE. For a single receive antenna, the circuit can be represented as the circuit model 500. Here, $v_i$ denotes the open-circuit voltage induced on the UE receive antenna by the signal arriving from the i-th eNB antenna, $Z_A$ denotes the self-impedance of the antenna, and $Z_L$ denotes the load impedance. The power delivered to the load impedance is maximized in the case that $$Z_L=Z_A^*.$$

For a UE with a single receive antenna, the voltage across the load impedance is given by $$v_i = \frac{Z_L}{Z_A} \cdot$$

Figure 6:
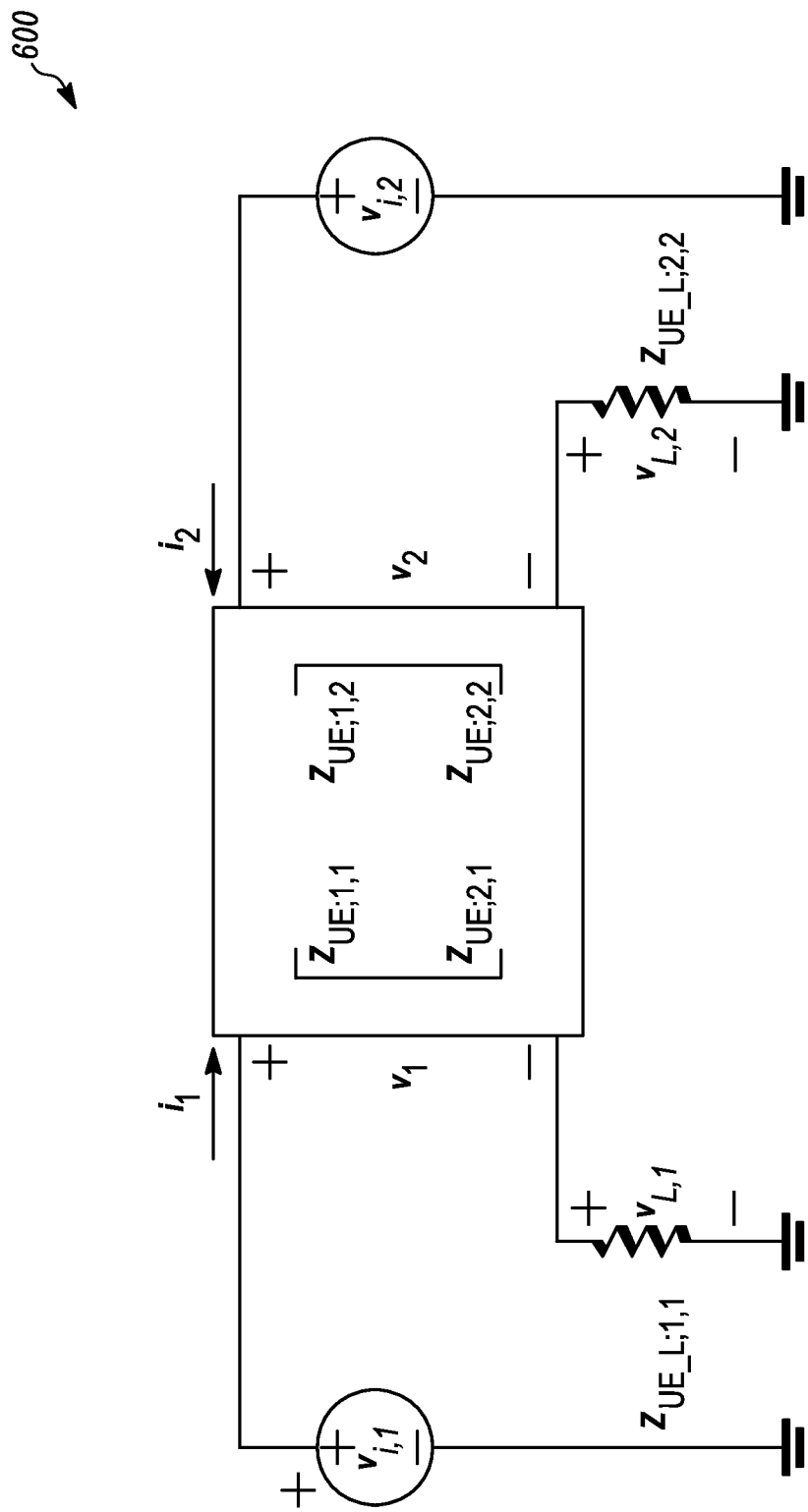
FIG. 6 is an example illustration of a circuit model for a two-element receive array according to a possible embodiment.

FIG. 6 is an example illustration of a circuit model 600 for a two-element receive array according to a possible embodiment. Next we consider the channel vector measured by an array of coupled antennas at the UE when the UE antenna array load impedance is $Z_{UE\_L}$. As before, we consider the case of a two element array with impedance matrix $Z_{UE}$ as shown in the circuit model 600. For the two antenna circuit model 600, it can be shown that the voltage across the load impedance is given by $$v_{L,i}=Z_{UE\_L}(Z_{UE}+Z_{UE\_L})^{-1}v_{S,i}$$

where $Z_{UE\_L}$ is the diagonal matrix given by $$Z_{UE\_L} = \begin{bmatrix} Z_{UE\_L;1,1} & 0 \\ 0 & Z_{UE\_L;2,2} \end{bmatrix}.$$

In the limit as $Z_{UE\_L} \to \infty \cdot I_{N \times N}$, the voltage across the load impedance converges to $$v_{L,i} \to v_{S,i},$$

which is the open-circuit voltage. If there is no coupling between the UE receive antennas so that $Z_{UE;1,2}=Z_{UE;2,1}=0$, then the voltage across the load impedance is given by $$v_{L,i} = \begin{bmatrix} \frac{Z_{UE\_L;1,1}}{Z_{UE;1,1}+Z_{UE\_L;1,1}}v_{S;i,1} \\ \frac{Z_{UE\_L;2,2}}{Z_{UE;2,2}+Z_{UE\_L;2,2}}v_{S;i,2} \end{bmatrix}.$$

For end-to-end channel including mutual coupling, we now consider the end-to-end matrix channel from the eNB transmitter to the voltages across the load impedances at the UE. We define $$G_{eNB \to UE}^{Thev}(Z_{eNB\_Thev},Z_{UE\_L})$$

as the matrix channel measured at the UE when a Thevenin source is used at the eNB. In this notation, the dependence of the measurement on the source impedance of the eNB, $Z_{eNB\_Thev}$, and the load impedance of the UE, $Z_{UE\_L}$, is indicated explicitly. The dependence of the measurement on the mutual impedance parameters $Z_{eNB}$ and $Z_{UE}$ of the eNB and UE antenna arrays, respectively, is suppressed as these are a function of the antenna arrays only and are assumed fixed. Similarly, let $$G_{eNB \to UE}^{Nor}(Z_{eNB\_Nor},Z_{UE\_L})$$

denote the matrix channel from the eNB transmitter to the voltages across the load impedances at the UE when a Norton source is used at the eNB.

If a Thevenin source is used at the eNB, the channel matrix measured across the load impedances at the UE is given by $$G_{eNB \to UE}^{Thev}(Z_{eNB\_Thev}, Z_{UE\_L}) = F_{eNB \to UE}^{Thev}(Z_{eNB\_Thev})(Z_{UE} + Z_{UE\_L})^{-T} Z_{UE\_L}^{T}$$
$$= (Z_{eNB\_Thev} + Z_{eNB})^{-1} H_{eNB \to UE}(Z_{UE} + Z_{UE\_L})^{-T} Z_{UE\_L}^{T}.$$

Similarly, if a Norton source is used at the eNB, the channel matrix measured across the load impedances at the UE is given by $$G_{eNB \to UE}^{Nor}(Z_{eNB\_Nor}, Z_{UE\_L}) = F_{eNB \to UE}^{Nor}(Z_{eNB\_Nor})(Z_{UE} + Z_{UE\_L})^{-T} Z_{UE\_L}^{T}$$
$$= (Z_{eNB\_Nor}^{-1} + Z_{eNB}^{-1})^{-1} Z_{eNB}^{-1} H_{eNB \to UE}(Z_{UE} + Z_{UE\_L})^{-T} Z_{UE\_L}^{T}.$$

In order to consider when reciprocity holds with respect to the measurements taken by the UE and the eNB, we define $$F_{UE \to eNB}^{Thev}(Z_{UE\_Thev}) \text{ and } F_{UE \to eNB}^{Nor}(Z_{UE\_Nor})$$

as the matrix channel observed at the eNB antenna array when the eNB antenna array is open circuit and when the UE transmit array is driven by a Thevenin and Norton sources, respectively, and define $$G_{UE \to eNB}^{Thev}(Z_{UE\_Thev}, Z_{eNB\_L}) \text{ and } G_{UE \to eNB}^{Nor}(Z_{UE\_Nor}, Z_{eNB\_L})$$

as the matrix channel measured across the load impedances at the eNB when the UE is driven by a Thevenin and Norton source, respectively. From the previous analysis of the UE channel measurement, it is straightforward to show that $$G_{UE \to eNB}^{Thev}(Z_{UE\_Thev}, Z_{eNB\_L}) = F_{UE \to eNB}^{Thev}(Z_{UE\_Thev})(Z_{eNB} + Z_{eNB\_L})^{-T} Z_{eNB\_L}^{T}$$
$$= (Z_{UE\_Thev} + Z_{UE})^{-1} H_{UE \to eNB}(Z_{eNB} + Z_{eNB\_L})^{-T} Z_{eNB\_L}^{T}$$

and $$G_{UE \to eNB}^{Nor}(Z_{UE}, Z_{eNB\_L}) = F_{UE \to eNB}^{Nor}(Z_{UE\_nor})(Z_{eNB} + Z_{eNB\_L})^{-T} Z_{eNB\_L}^{T}$$
$$= (Z_{UE\_Nor}^{-1} + Z_{UE}^{-1})^{-1} Z_{UE}^{-1} H_{UE \to eNB}(Z_{eNB} + Z_{eNB\_L})^{-T} Z_{eNB\_L}^{T}.$$

As noted previously, it is typically assumed that the channel is reciprocal so that $$H_{UE \to eNB} = H_{eNB \to UE}^{T},$$

where it is understood that the channel measurement reflects the antenna patterns of both the transmit and receive antennas. However, what has generally not been considered is the impact of antenna coupling at both the transmitter and the receiver on the channel that is measured at the receiver.

In the case that a Thevenin source is used at both the eNB and the UE, the measurements at the UE and the eNB will be reciprocal if and only if $$G_{eNB \to UE}^{Thev}(Z_{eNB\_Thev}, Z_{UE\_L}) = (G_{UE \to eNB}^{Thev}(Z_{UE\_Thev}, Z_{eNB\_L}))^{T}$$

Using the assumption that $H_{UE \to eNB} = H_{eNB \to UE}^{T}$, we have $$G_{eNB \to UE}^{Thev}(Z_{eNB\_Thev}, Z_{UE\_L}) = (Z_{eNB\_Thev} + Z_{eNB})^{-1} H_{eNB \to UE}(Z_{UE} + Z_{UE\_L})^{-T} Z_{UE\_L}^{T}$$

and $$G_{UE \to eNB}^{Thev}(Z_{UE\_Thev}, Z_{eNB\_L}) = (Z_{UE\_Thev} + Z_{UE})^{-1} H_{eNB \to UE}^{T}(Z_{eNB} + Z_{eNB\_L})^{-T} Z_{eNB\_L}^{T}.$$

These two equations give the relationship between the end-to-end channels from the eNB to the UE, $G_{eNB \to UE}^{Thev}(Z_{eNB\_Thev}, Z_{UE\_L})$, and from the UE to the eNB $G_{UE \to eNB}^{Thev}(Z_{UE\_Thev}, Z_{eNB\_L})$.

The UE measures $G_{eNB \to UE}^{Thev}(Z_{eNB\_Thev}, Z_{UE\_L})$ using reference symbols transmitted from the eNB. If the eNB signals the M×M matrix $$(Z_{eNB\_Thev} + Z_{eNB})^{T}(Z_{eNB} + Z_{eNB\_L})^{-T} Z_{eNB\_L}^{T}$$

to the UE, then the UE can compute the channel from the UE to the eNB as $$G_{UE \to eNB}^{Thev}(Z_{UE\_Thev}, Z_{eNB\_L}) = (Z_{UE\_Thev} + Z_{UE})^{-1} (Z_{UE} + Z_{UE\_L}) Z_{UE\_L}^{-1} \cdot (G_{eNB \to UE}^{Thev}(Z_{eNB\_Thev}, Z_{UE\_L}))^{T}(Z_{eNB\_Thev} + Z_{eNB})^{T}(Z_{eNB} + Z_{eNB\_L})^{-T} Z_{eNB\_L}^{T},$$

so long as the UE has knowledge of its own impedance matrix $Z_{UE}$, transmit source impedance $Z_{UE\_Thev}$, and receive load impedance $Z_{UE\_L}$, and can compute $$(Z_{UE\_Thev} + Z_{UE})^{-1}(Z_{UE} + Z_{UE\_L}) Z_{UE\_L}^{-1}.$$

Similarly, the eNB measures $G_{UE \to eNB}^{Thev}(Z_{UE\_Thev}, Z_{eNB\_L})$ using reference symbols transmitted from the UE. If the UE signals the N×N matrix $$(Z_{UE\_Thev} + Z_{UE})^{T}(Z_{UE} + Z_{UE\_L})^{T} Z_{UE\_L}^{T}$$

to the eNB, then the eNB can compute the channel from the eNB to the UE as $$G_{UE \to eNB}^{Thev}(Z_{UE\_Thev}, Z_{eNB\_L}) = (Z_{UE\_Thev} + Z_{UE})^{-1} Z_{UE} + Z_{UE\_L}) Z_{UE\_L}^{-1} \cdot (G_{eNB \to UE}^{Thev}(Z_{eNB\_Thev}, Z_{UE\_L}))^{T}(Z_{eNB\_Thev} + Z_{eNB})^{T}(Z_{eNB} + Z_{eNB\_L})^{-T} Z_{eNB\_L}^{T}$$

so long as the eNB has knowledge of its own impedance matrix $Z_{eNB}$, transmit source impedance $Z_{eNB\_Thev}$, and receive load impedance $Z_{eNB\_L}$, and can compute $$(Z_{eNB\_Thev} + Z_{eNB})^{T}(Z_{eNB} + Z_{eNB\_L})^{-T} Z_{eNB\_L}^{T}.$$

It should be noted that if there is no antenna coupling at either the eNB or the UE, then the matrices $Z_{eNB}$ and $Z_{eNB}$ are diagonal. Since the matrices $Z_{eNB\_Thev}$ and $Z_{UE\_Thev}$ are diagonal, it follows in this case the matrices needed to compute the reverse channel, and $$(Z_{eNB\_Thev} + Z_{eNB})^{T}(Z_{eNB} + Z_{eNB\_L})^{-T} Z_{eNB\_L}^{T}$$

$$(Z_{UE\_Thev} + Z_{UE})^{T}(Z_{UE} + Z_{UE\_L})^{-T} Z_{UE\_L}^{T}$$

are also diagonal, and it is only necessary to signal M values from the eNB to the UE and N values from the UE to the eNB in order for each to compute the reverse channel.

If it is assumed that the eNB source and load impedances are equal, and similarly, that the UE source and load impedances are equal, then $$Z_{eNB\_Thev} = Z_{eNB\_L} \text{ and } Z_{UE\_Thev} = Z_{UE\_L}.$$

The forward and reverse channels are then given by $$G_{eNB \rightarrow UE}^{Thev}(Z_{eNB\_Thev}, Z_{UE\_L}) = (Z_{eNB\_L} + Z_{eNB})^{-1} H_{eNB \rightarrow UE}(Z_{UE} + Z_{UE\_L})^{-1} Z_{UE\_L}^{T}$$

and $$(G_{UE \rightarrow eNB}^{Thev}(Z_{UE\_Thev}, Z_{eNB\_L}))^{T} = Z_{eNB\_L}(Z_{eNB} + Z_{eNB\_L})^{-1} H_{eNB \rightarrow UE}(Z_{UE\_L} + Z_{UE})^{-T}.$$

with the result that the forward and reverse channels have the relation $$G_{eNB \rightarrow UE}^{Thev}(Z_{eNB\_Thev}, Z_{UE\_L}) = Z_{eNB\_L}^{-1} (G_{UE \rightarrow eNB}^{Thev}(Z_{UE\_Thev}, Z_{eNB\_L}))^{T} Z_{UE\_L}^{T}$$

and $$G_{UE \rightarrow eNB}^{Thev}(Z_{UE\_Thev}, Z_{eNB\_L}) = Z_{UE\_L}^{-1} (G_{eNB \rightarrow UE}^{Thev}(Z_{eNB\_Thev}, Z_{UE\_L}))^{T} Z_{eNB\_L}^{T},$$

where $Z_{eNB\_L}$ and $Z_{UE\_L}$ are diagonal matrices. In order for the eNB to compute the channel from the eNB to the UE from the measurement of the channel from the UE to the eNB, the UE should signal the diagonal N×N matrix $Z_{UE\_L}$ to the eNB. Similarly, in order for the UE to compute the channel from the UE to the eNB from the measurement of the channel from the eNB to the UE, the eNB should signal the diagonal N×N matrix $Z_{eNB\_L}$ to the UE. Because the matrices $Z_{UE\_L}$ and $Z_{eNB\_L}$ are diagonal, it is only necessary to signal N and M values should be signaled to the eNB and UE, respectively, in order for each to compute the reverse channel.

If it is further assumed that the UE load impedances are all equal, and similarly, the eNB load impedances are equal to each other, then the load impedance matrices can be expressed as $$Z_{UE\_L} = Z_{UE\_L} I_{N \times N} \text{ and } Z_{eNB\_L} = Z_{eNB\_L} I_{M \times M}.$$

With this further constraint, we have $$G_{eNB \rightarrow UE}^{Thev}(Z_{eNB\_Thev}, Z_{UE\_L}) = Z_{UE\_L} Z_{eNB\_L}^{-1} (G_{UE \rightarrow eNB}^{Thev}(Z_{UE\_Thev}, Z_{eNB\_L}))^{T},$$

so that the forward and reverse channels are reciprocal within the scalar constant $Z_{UE\_L} Z_{eNB\_L}^{-1}$. The scale factor is due to the fact that for the model used here, the radiated power is inversely proportional to the source impedance when the source impedance and the antenna self-impedance are matched. In assessing the quality of the link from the UE to the eNB from measurements of the link from the eNB to the UE, the UE should account for this difference in transmit power between the two links.

We now consider the relationship between the forward and reverse channels under the condition that the source impedance at both the eNB and the UE is zero, as this maximizes the transmitter efficiency for a Thevenin source. With this assumption, the forward and reverse channels are given by $$G_{eNB \rightarrow UE}^{Thev}(Z_{eNB\_Thev} = 0, Z_{UE\_L}) = Z_{eNB}^{-1} H_{eNB \rightarrow UE} (Z_{UE} + Z_{UE\_L})^{-T} Z_{UE\_L}^{T}$$

and $$(G_{eNB \rightarrow UE}^{Thev}(Z_{eNB\_Thev} = 0, Z_{eNB\_L}))^{T} = Z_{eNB\_L}(Z_{eNB} + Z_{eNB\_L})^{-1} H_{eNB \rightarrow UE} Z_{UE}^{-T}$$

and the relationship between the forward and reverse channels is given by $$G_{eNB \rightarrow UE}^{Thev}(Z_{eNB\_Thev} = 0, Z_{UE\_L}) = (Z_{eNB}^{-1} + Z_{eNB\_L}^{-1}) (G_{UE \rightarrow eNB}^{Thev}(Z_{UE\_Thev} = 0, Z_{eNB\_L}))^{T} \cdot (Z_{UE}^{-1} + Z_{UE\_L}^{-1})^{-T}$$

and $$G_{UE \rightarrow eNB}^{Thev}(Z_{UE\_Thev} = 0, Z_{eNB\_L}) = (Z_{UE}^{-1} + Z_{UE\_L}^{-1}) (G_{eNB \rightarrow UE}^{Thev}(Z_{eNB\_Thev} = 0, Z_{UE\_L}))^{T} \cdot (Z_{eNB}^{-1} + Z_{eNB\_L}^{-1})^{-T}.$$

Thus, in order for the eNB to compute the forward channel from the reverse channel measurement, the UE should signal the N×N matrix $(Z_{UE}^{-1} + Z_{UE\_L}^{-1})^{-T}$ to the eNB. Similarly, in order for the UE to compute the reverse channel from the forward channel measurement, the eNb should signal the M×M matrix $(Z_{eNB}^{-1} + Z_{eNB\_L}^{-1})^{-T}$ to the UE. In the special case in which the impedance matrices $Z_{eNB}$ and $Z_{UE}$ are diagonal (no coupling in the eNB and UE arrays), the matrices $(Z_{UE}^{-1} Z_{UE\_L}^{-1})^{-T}$ and $(Z_{eNB}^{-1} + Z_{eNB\_L}^{-1})^{-T}$ are diagonal.

If the antennas in the eNB array are uncoupled and have equal self-impedance, and similarly, that the antennas in the UE array are uncoupled and have equal self-impedance, then the impedance matrices can be expressed as $$Z_{eNB} = Z_{eNB} I_{M \times M} \text{ and } Z_{UE} = Z_{UE} I_{N \times N}.$$

If it is also assumed that the UE load impedances are all equal, and similarly, the eNB load impedances are all equal, then the load impedance matrices can be expressed as $$Z_{UE\_L} = Z_{UE\_L} I_{N \times N} \text{ and } Z_{eNB\_L} = Z_{eNB\_L} I_{M \times M}.$$

With these assumptions, the relationship between the forward and reverse channels is given by $$G_{eNB \rightarrow UE}^{Thev}\begin{pmatrix} Z_{eNB\_Thev} = 0, \\ Z_{UE\_L} \end{pmatrix} = Z_{eNB\_L}\begin{pmatrix} Z_{eNB\_L}^{-1} + \\ Z_{eNB}^{-1} \end{pmatrix}\left(G_{UE \rightarrow eNB}^{Thev}\begin{pmatrix} Z_{UE\_Thev} = 0, \\ Z_{eNB\_L} \end{pmatrix}\right)^{T} Z_{UE}(Z_{UE} + Z_{UE\_L}) - 1$$

$$= \left(\frac{Z_{eNB} Z_{eNB\_L}}{Z_{eNB} + Z_{eNB\_L}}\right)^{-1}\left(\frac{Z_{UE} Z_{UE\_L}}{Z_{UE} + Z_{UE\_L}}\right) (G_{UE \rightarrow eNB}^{Thev}(Z_{UE\_Thev} = 0, Z_{eNB\_L}))^{T}$$

Thus, even if the source impedance is not matched to the load impedance, the measured channels are reciprocal within a multiplicative constant so long as there is no mutual coupling of the antennas at the eNB array or the UE array. Furthermore, the multiplicative constant is the ratio of the harmonic mean of the load impedance and the antenna self-impedance for the UE to that of the harmonic mean of the load impedance and antenna self-impedance for the eNB.

In the case that a Norton source is used at both the eNB and the UE, the measurements at the UE and the eNB will be reciprocal if and only if $$G_{eNB \rightarrow UE}^{Nor}(Z_{eNB\_Nor}, Z_{UE\_L}) = (G_{UE \rightarrow eNB}^{Nor}(Z_{UE\_Nor}, Z_{eNB\_L}))^{T}.$$

Using the fact that $H_{UE \to eNB} = H_{eNB \to UE}^T$, we have $$G_{eNB \to UE}^{Nor}(Z_{eNB\_Nor}, Z_{UE\_L}) = (Z_{eNB\_Nor}^{-1} + Z_{eNB}^{-1})^{-1} Z_{eNB}^{-1} H_{eNB \to UE}(Z_{UE} + Z_{UE\_L})^{-T} Z_{UE\_L}^T$$

and $$G_{eNB \to UE}^{Nor}(Z_{UE\_Nor}, Z_{eNB\_L}) = (Z_{UE\_Nor}^{-1} + Z_{UE}^{-1})^{-1} Z_{UE}^{-1} H_{eNB \to UE}^T(Z_{eNB} + Z_{eNB\_L})^{-T} Z_{eNB\_L}^T$$

These two equations give the relationship between the end-to-end channels from the eNB to the UE $G_{eNB \to UE}^{Nor}(Z_{eNB\_Nor}, Z_{UE\_L})$, and from the UE to the eNB $G_{UE \to eNB}^{Nor}(Z_{UE\_Nor}, Z_{eNB\_L})$ The UE measures $G_{eNB \to UE}^{Nor}(Z_{eNB\_Nor}, Z_{UE\_L})$ using reference symbols transmitted from the eNB. If the eNB signals the M×M matrix $$(Z_{eNB\_Nor}^{-1} + Z_{eNB}^{-1})^T Z_{eNB}^T (Z_{eNB} + Z_{eNB\_L})^{-T} Z_{eNB\_L}^T$$

to the UE, then the UE can compute the channel from the UE to the eNB as $$G_{UE \to eNB}^{Nor}(Z_{UE\_Nor}, Z_{eNB\_L}) = (Z_{UE\_Nor}^{-1} + Z_{UE}^{-1})^{-1} Z_{UE}^{-1}(Z_{UE} + Z_{UE\_L}) Z_{UE\_L}^{-1} \cdot (G_{eNB \to UE}^{Nor}(Z_{eNB\_Nor}, Z_{UE\_L}))^T (Z_{eNB\_Nor}^{-1} + Z_{eNB}^{-1})^T Z_{eNB}^T (Z_{eNB} + Z_{eNB\_L})^{-T} Z_{eNB\_L}^T.$$

so long as the UE has knowledge of its own impedance matrix $Z_{UE}$, transmit source impedance $Z_{UE\_Nor}$, and receive load impedance $Z_{UE\_L}$, and can compute $$(Z_{UE\_Nor}^{-1} + Z_{UE}^{-1})^T Z_{UE}^T (Z_{UE} + Z_{UE\_L})^{-T} Z_{UE\_L}^T,$$

Similarly, the eNB measures $G_{UE \to eNB}^{Nor}(Z_{UE\_Nor}, Z_{eNB\_L})$ using reference symbols transmitted from the UE. If the UE signals the N×N matrix $$Z_{UE\_Nor}^{-1} + Z_{UE}^{-1})^T Z_{UE}^T (Z_{UE} + Z_{UE\_L})^{-T} Z_{UE\_L}^T,$$

the eNB can compute the channel from the eNB to the UE as $$G_{eNB \to UE}^{Nor}(Z_{eNB\_Nor}, Z_{UE\_L}) = (Z_{eNB\_Nor}^{-1} + Z_{eNB}^{-1})^{-1} Z_{eNB}^{-1}(Z_{eNB} + Z_{eNB\_L}) Z_{eNB\_L}^{-1} \cdot (G_{UE \to eNB}^{Nor}(Z_{UE\_Nor}, Z_{eNB\_L}))^T Z_{UE\_Nor}^{-1} + Z_{UE}^{-1})^T Z_{UE}^T (Z_{UE} + Z_{UE\_L})^{-T} Z_{UE\_L}^T,$$

so long as the eNB has knowledge of its own impedance matrix $Z_{eNB}$, transmit source impedance $Z_{eNB\_Nor}$, and receive load impedance $Z_{eNB\_L}$, and can compute $$(Z_{eNB\_Nor}^{-1} + Z_{eNB}^{-1})^{-1} Z_{eNB}^{-1} (Z_{eNB} + Z_{eNB\_L}) Z_{eNB\_L}^{-1},$$

It should be noted that if there is no antenna coupling at either the eNB or the UE, then the matrices $Z_{eNB}$ and $Z_{UE}$ are diagonal. Since the matrices $Z_{eNB\_Nor}$ and $Z_{UE\_Nor}$ are diagonal, it follows in this case the matrices needed to calculate the reverse channel, $$(Z_{eNB\_Nor}^{-1} + Z_{eNB}^{-1})^T Z_{eNB}^T (Z_{eNB} + Z_{eNB\_L})^{-T} Z_{eNB\_L}^T$$

and $$(Z_{UE\_Nor}^{-1} + Z_{UE}^{-1})^T Z_{UE}^T (Z_{UE} + Z_{UE\_L})^{-T} Z_{UE\_L}^T$$

are also diagonal and it is only necessary to signal M values from the eNB to the UE and N values from the UE to the eNB.

If it is assumed that the eNB source and load impedances are equal, and similarly, that the UE source and load impedances are equal, then $$Z_{eNB\_Nor} = Z_{eNB\_L} \text{ and } Z_{UE\_Nor} = Z_{UE\_L}.$$

The forward and reverse channels are then given by $$G_{eNB \to UE}^{Nor}(Z_{eNB\_Nor}, Z_{UE\_L}) = (Z_{eNB\_L}^{-1} + Z_{eNB}^{-1})^{-1} Z_{eNB}^{-1} H_{eNB \to UE}(Z_{UE} + Z_{UE\_L})^{-T} Z_{UE\_L}^T$$

$$= Z_{eNB\_L}(Z_{eNB\_L}^{-1} + Z_{eNB})^{-1} H_{eNB \to UE}(Z_{UE} + Z_{UE\_L})^{-T} Z_{UE\_L}^T$$

and $$(G_{UE \to eNB}^{Nor}(Z_{UE\_Nor}, Z_{eNB\_L}))^T = Z_{eNB\_L}(Z_{eNB} + Z_{eNB\_L})^{-1} H_{eNB \to UE} Z_{UE}^{-T}(Z_{UE\_L}^{-1} + Z_{UE}^{-1})^{-T}$$

$$= Z_{eNB\_L}(Z_{eNB} + Z_{eNB\_L})^{-1} H_{eNB \to UE}(Z_{UE\_L} + Z_{UE})^{-T} Z_{UE\_L}^T$$

with the result that $$G_{eNB \to UE}^{Nor}(Z_{eNB\_Nor}, Z_{UE\_L}) = (G_{UE \to eNB}^{Nor}(Z_{UE\_Nor}, Z_{eNB\_L}))^T$$

so that the forward and reverse channels are reciprocal.

We now consider the relationship between the forward and reverse channels under the condition that the source impedance at both the eNB and the UE is infinite, as this maximizes the transmitter efficiency for a Norton source. With this assumption, the forward and reverse channels are given by $$G_{eNB \to UE}^{Nor}(Z_{eNB\_Nor} \to \infty \cdot I_{M \times M}, Z_{UE\_L}) = H_{eNB \to UE}(Z_{UE} + Z_{UE\_L})^{-T} Z_{UE\_L}^T$$

and $$(G_{UE \to eNB}^{Nor}(Z_{UE\_Nor} \to \infty \cdot I_{M \times M}, Z_{eNB\_L}))^T = Z_{eNB\_L}(Z_{eNB} + Z_{eNB\_L})^{-1} H_{eNB \to UE}$$

and the relationship between the forward and reverse channels is given by $$G_{eNB \to UE}^{Nor}(Z_{eNB\_Nor} \to \infty \cdot I_{M \times M}, Z_{UE\_L}) = (Z_{eNB} + Z_{eNB\_L})$$

$$Z_{eNB\_L}^{-1}(G_{UE \to eNB}^{Nor}(Z_{UE\_Nor} \to \infty \cdot I_{M \times M}, Z_{eNB\_L}))^T(Z_{UE} + Z_{UE\_L})^{-T} Z_{UE\_L}^T$$

and $$G_{UE \to eNB}^{Nor}(Z_{UE\_Nor} \to \infty \cdot I_{M \times M}, Z_{eNB\_L}) =$$

$$(Z_{UE} + Z_{UE\_L}) Z_{eNB\_L}^{-1} (G_{eNB \to UE}^{Nor}(Z_{eNB\_Nor} \to \infty \cdot I_{M \times M}, Z_{UE\_L}))^T$$

$$(Z_{eNB} + Z_{eNB\_L})^{-T} Z_{eNB\_L}^T.$$

Thus, in order for the eNB to compute the forward channel from the reverse channel measurement, the UE should signal the N×N matrix $(Z_{UE} + Z_{UE\_L})^{-T} Z_{UE\_L}^T$ to the eNB. Similarly, in order for the UE to compute the reverse channel from the forward channel measurement, the eNB should signal the M×M matrix $(Z_{eNB} + Z_{eNB\_L})^{-T} Z_{eNB\_L}^T$ to the UE. In the special case in which the impedance matrices $Z_{eNB}$ and $Z_{UE}$ are diagonal (no coupling in the eNB and UE arrays), the matrices $(Z_{UE} + Z_{UE\_L})^{-T} Z_{UE\_L}^T$ and $(Z_{eNB} + Z_{eNB\_L})^{-T} Z_{eNB\_L}^T$ are diagonal so that the number of coefficients which should be signaled is N and M, respectively.

If the antennas in the eNB array are uncoupled and have equal self-impedance, and similarly, that the antennas in the UE array are uncoupled and have equal self-impedance, then the impedance matrices can be expressed as $$Z_{eNB} = Z_{eNB} I_{M \times M} \text{ and } Z_{UE} = Z_{UE} I_{N \times N}.$$

If it is also assumed that the UE load impedances are all equal, and similarly, the eNB load impedances are all equal, then the load impedance matrices can be expressed as $$Z_{UE\_L} = Z_{UE\_L} I_{N \times N} \text{ and } Z_{eNB\_L} = Z_{eNB\_L} I_{M \times M}.$$

With these assumptions, the relationship between the forward and reverse channels is given by $$G_{eNB \to UE}^{Nor}(Z_{eNB\_Nor} \to \infty \cdot I_{M \times M}, Z_{UE\_L}) = \left(\frac{Z_{eNB\_L}}{Z_{eNB} + Z_{eNB\_L}}\right)^{-1}$$

$$\left(\frac{Z_{UE\_L}}{Z_{UE} + Z_{UE\_L}}\right)(G_{UE \to eNB}^{Nor}(Z_{UE\_Nor} \to \infty \cdot I_{N \times N}, Z_{eNB\_L}))^T,$$

Thus, even if the source impedance is not matched to the load impedance, the measured channels are reciprocal within a multiplicative constant so long as there is no mutual coupling of the antennas at the eNB array or the UE array.

For a Thevenin source at the eNB and a Norton source at the UE, as well as for a Norton source at the UE and a Thevenin source at the eNB, the analysis can be similar to that described above.

As shown previously, if a Thevenin source is used at both the eNB and the UE the forward and reverse channels have the relationship $$G_{UE \to eNB}^{Thev}(Z_{UE\_Thev}, Z_{eNB\_L}) = (Z_{UE\_Thev} + Z_{UE})^{-1}$$
$$(Z_{UE} + Z_{UE\_L}) Z_{UE\_L}^{-1} \cdot (G_{eNB \to UE}^{Thev}(Z_{eNB\_Thev}, Z_{UE\_L}))^T (Z_{eNB\_Thev} + Z_{eNB})^T (Z_{eNB} + Z_{eNB\_L})^{-T} Z_{eNB\_L}^T$$

and $$G_{eNB \to UE}^{Thev}(Z_{eNB\_Thev}, Z_{UE\_L}) = (Z_{eNB\_Thev} + Z_{eNB})^{-1}$$
$$(Z_{eNB} + Z_{eNB\_L}) Z_{eNB\_L}^{-1} \cdot (G_{UE \to eNB}^{Thev}(Z_{UE\_Thev}, Z_{eNB\_L}))^T (Z_{UE\_Thev} + Z_{UE})^T (Z_{UE} + Z_{UE\_L})^{-T} Z_{UE\_L}^T$$

In order for the UE to compute the UE to eNB channel from its measurement of $$G_{eNB \to UE}^{Thev}(Z_{eNB\_Thev}, Z_{UE\_L}),$$

and its presumed knowledge of $$(Z_{UE\_Thev} + Z_{UE})^{-1}(Z_{UE} + Z_{UE\_L}) Z_{UE\_L}^{-1},$$

the eNB should signal the $M \times M$ matrix $$(Z_{eNB\_Thev} + Z_{eNB})^T (Z_{eNB} Z_{eNB\_L})^{-T} Z_{eNB\_L}^T$$

to the UE. Similarly, in order for the eNB to compute the eNB to UE channel from its measurement of $$G_{UE \to eNB}^{Thev}(Z_{UE\_Thev}, Z_{eNB\_L})$$

and its presumed knowledge of $$(Z_{eNB\_Thev} + Z_{eNB})^{-1}(Z_{eNB} + Z_{eNB\_L}) Z_{eNB\_L}^{-1},$$

the UE should signal the $N \times N$ matrix $$(Z_{UE\_Thev} + Z_{UE})^T (Z_{UE} + Z_{UE\_L})^{-T} Z_{UE\_L}^T$$

to the eNB.

There is an alternative method which allows the receiver to compute the reverse ink channel without knowledge of the transmitter's transmit and receive coupling matrices. For this method, we first note that the channel from the UE to the eNB can be expressed as $$G_{UE \to eNB}^{Thev}(Z_{UE\_Thev}, Z_{eNB\_L}) = ((Z_{UE\_Thev} + Z_{UE})^{-1}$$
$$(Z_{UE} + Z_{UE\_L}) Z_{UE\_L}^{-1} \cdot (Z_{eNB\_L}(Z_{eNB} + Z_{eNB\_L})^{-1}$$
$$(Z_{eNB\_Thev} + Z_{eNB}) G_{eNB \to UE}^{Thev}(Z_{eNB\_Thev}, Z_{UE\_L}))^T.$$

Thus, if the vector input to the antenna at the eNB is multiplied by $$Z_{eNB\_L}(Z_{eNB} + Z_{eNB\_L})^{-1}(Z_{eNB\_Thev} + Z_{eNB})$$

when reference symbols are transmitted, the UE measurement will be $$Z_{eNB\_L}(Z_{eNB} + Z_{eNB\_L})^{-1} Z_{eNB\_Thev} + Z_{eNB}) G_{eNB \to UE}^{Thev}(Z_{eNB\_Thev}, Z_{UE\_L}),$$

so that the UE no longer needs explicit knowledge of the eNB coupling in order to compute the UE to eNB channel since it is no longer necessary to correct the measured channel for the difference between the eNB transmitter and the eNB receiver.

Similarly, the channel from the eNB to the UE can be expressed as $$G_{eNB \to UE}^{Thev}(Z_{eNB\_Thev}, Z_{UE\_L}) = (Z_{eNB\_Thev} + Z_{eNB})^{-1}$$
$$(Z_{eNB} + Z_{eNB\_L}) Z_{eNB\_L}^{-1} \cdot (Z_{UE\_L}(Z_{UE} + Z_{UE\_L})^{-1}$$
$$(Z_{UE\_Thev} + Z_{UE}) G_{UE \to eNB}^{Thev}(Z_{UE\_Thev}, Z_{eNB\_L}))^T.$$

Thus, if the vector input to the antenna at the UE is multiplied by $$Z_{UE\_L}(Z_{UE} + Z_{UE\_L})^{-1}(Z_{UE\_Thev} + Z_{UE})$$

when reference symbols are transmitted, the UE measurement will be $$Z_{UE\_L}(Z_{UE} + Z_{UE\_L})^{-1} Z_{UE\_Thev} + Z_{UE}) G_{UE \to eNB}^{Thev}(Z_{UE\_Thev}, Z_{eNB\_L}),$$

so that the eNB no longer needs explicit knowledge of the UE coupling in order to compute the eNB to UE channel since it is no longer necessary to correct the measured channel for the difference between the UE transmitter and the UE receiver.

If a Norton source is used at both the eNB and the UE the forward and reverse channels have the relationship $$G_{UE \to eNB}^{Nor}(Z_{UE\_Nor}, Z_{eNB\_L}) = (Z_{UE\_Nor}^{-1} + Z_{UE}^{-1})^{-1} Z_{UE}^{-1}(Z_{UE} + Z_{UE\_L}) Z_{UE\_L}^{-1} \cdot (G_{eNB \to UE}^{Nor}(Z_{eNB\_Nor}, Z_{UE\_L}))^T (Z_{eNB\_Nor}^{-1} + Z_{eNB}^{-1})^T Z_{eNB}^T (Z_{eNB} + Z_{eNB\_L})^{-T} Z_{eNB\_L}^T$$

and $$G_{eNB \to UE}^{Nor}(Z_{eNB\_Nor}, Z_{UE\_L}) = (Z_{eNB\_Nor}^{-1} + Z_{eNB}^{-1})^{-1} Z_{eNB}^{-1}(Z_{eNB} + Z_{eNB\_L}) Z_{eNB\_L}^{-1} \cdot (G_{UE \to eNB}^{Nor}(Z_{UE\_Nor}, Z_{eNB\_L}))^T (Z_{UE\_Nor}^{-1} + Z_{UE}^{-1})^T Z_{UE}^T (Z_{UE} + Z_{UE\_L})^{-T} Z_{UE\_L}^T.$$

In order for the UE to compute the UE to eNB channel from its measurement of $$G_{eNB \to UE}^{Nor}(Z_{eNB\_Nor}, Z_{UE\_L}),$$

and its presumed knowledge of $$(Z_{UE\_Nor}^{-1} + Z_{UE}^{-1})^{-1} Z_{UE}^{-1}(Z_{UE} + Z_{UE\_L}) Z_{UE\_L}^{-1},$$

the eNB should signal the $M \times M$ matrix $$(Z_{eNB\_Nor}^{-1} + Z_{eNB}^{-1})^T Z_{eNB}^T (Z_{eNB} + Z_{eNB\_L})^{-T} Z_{eNB\_L}^T$$

to the UE. Similarly, in order for the eNB to compute the eNB to UE channel from its measurement of $$G_{UE \to eNB}^{Nor}(Z_{UE\_Nor}, Z_{eNB\_L})$$

and its presumed knowledge of $$(Z_{eNB\_Nor} + Z_{eNB}^{-1})^{-1} Z_{eNB}^{-1} (Z_{eNB} + Z_{eNB\_L}) Z_{eNB\_L}^{-1},$$

the UE should signal the N×N matrix $$(Z_{UE\_Nor}^{-1} + Z_{UE}^{-1})^{-T} Z_{UE}^T (Z_{UE} + Z_{UE\_L})^{-T} Z_{UE\_L}^T$$

to the eNB.

There is an alternative method that allows the receiver to compute the reverse ink channel without knowledge of the transmitter's transmit and receive coupling matrices. For this method, we first note that the channel from the UE to the eNB can be expressed as $$G_{UE \to eNB}^{Nor}(Z_{UE\_Nor}, Z_{eNB\_L}) = (Z_{UE\_Nor}^{-1} + Z_{UE}^{-1})^{-1} Z_{UE}^{-1} (Z_{UE} + Z_{UE\_L}) Z_{UE\_L}^{-1} \cdot (Z_{eNB\_L} (Z_{eNB} + Z_{eNB\_L})^{-1} Z_{eNB} (Z_{eNB\_Nor}^{-1} + Z_{eNB}^{-1}) G_{eNB \to UE}^{Nor}(Z_{eNB\_Nor}, Z_{UE\_L}))^T.$$

Thus, if the vector input to the antenna at the eNB is multiplied by $$Z_{eNB\_L}(Z_{eNB} + Z_{eNB\_L})^{-1} Z_{eNB}(Z_{eNB\_Nor}^{-1} + Z_{eNB}^{-1})$$

when reference symbols are transmitted, the UE measurement will be $$Z_{eNB\_L}(Z_{eNB} + Z_{eNB\_L})^{-1} Z_{eNB}(Z_{eNB\_Nor}^{-1} + Z_{eNB}^{-1}) G_{eNB \to UE}^{Nor}(Z_{eNB\_Nor}, Z_{UE\_L}),$$

so that the UE no longer needs explicit knowledge of the eNB coupling in order to compute the UE to eNB channel since it is no longer necessary to correct the measured channel for the difference between the eNB transmitter and the eNB receiver.

Similarly, the channel from the eNB to the UE can be expressed as $$G_{eNB \to UE}^{Nor}(Z_{eNB\_Nor}, Z_{UE\_L}) = (Z_{eNB\_Nor}^{-1} + Z_{eNB}^{-1})^{-1} Z_{eNB}^{-1} (Z_{eNB} + Z_{eNB\_L}) Z_{eNB\_L}^{-1} \cdot (Z_{UE\_L}(Z_{UE} + Z_{UE\_L})^{-1} Z_{UE}(Z_{UE\_Nor}^{-1} + Z_{UE}^{-1}) G_{UE \to eNB}^{Nor}(Z_{UE\_Nor}, Z_{eNB\_L}))^T.$$

Thus, if the vector input to the antenna at the UE is multiplied by $$Z_{UE\_L}(Z_{UE} + Z_{UE\_L})^{-1} Z_{UE}(Z_{UE\_Nor}^{-1} + Z_{UE}^{-1}) G_{UE \to eNB}^{Nor}(Z_{UE\_Nor}, Z_{eNB\_L}),$$

when reference symbols are transmitted, the UE measurement will be $$Z_{UE\_L}(Z_{UE} + Z_{UE\_L})^{-1} Z_{UE}(Z_{UE\_Nor}^{-1} + Z_{UE}^{-1}) G_{UE \to eNB}^{Nor}(Z_{UE\_Nor}, Z_{eNB\_L}),$$

so that the eNB no longer needs explicit knowledge of the UE coupling in order to compute the eNB to UE channel since it is no longer necessary to correct the measured channel for the difference between the UE transmitter and the UE receiver.

For general source models at the eNB and the UE, let $G_{eNB \to UE}^{general}$ denote the end-to-end channel, including antenna coupling, as measured at the UE, and let $G_{UE \to eNB}^{general}$ denote the end-to-end channel, including antenna coupling, measured at the eNB. The two channels have the relationship $$G_{eNB \to UE}^{general} = A_{TX}(A_{RX})^{-1} (G_{UE \to eNB}^{general})^T (B_{TX})^{-T} (B_{RX})^T$$

$$G_{UE \to eNB}^{general} = B_{TX}(B_{RX})^{-1} (G_{eNB \to UE}^{general})^T (A_{TX})^{-T} (A_{RX})^T$$

where $A_{TX}$ and $A_{RX}$ are M×M matrices that denote the transmit and receive coupling matrices at the eNB, and $B_{TX}$ and $B_{RX}$ are N×N matrices that denote the transmit and receive coupling matrices at the UE.

In the following, it is assumed that eNB the has knowledge of the transmit and receive coupling for the eNB, given by $A_{TX}$ and $A_{RX}$, respectively. Similarly, it is assumed that the UE has knowledge of the transmit and receive coupling for the UE, given by $B_{TX}$ and $B_{RX}$, respectively. As in the examples above in which a Thevenin and Norton source were used at both the eNB and the UE, there are essentially two methods that can be used to enable the UE to learn $G_{UE \to eNB}^{general}$. In the first method, the eNB signals the M×M matrix $(A_{TX})^{-T} (A_{RX})^T$ to the UE. The UE uses the reference symbols transmitted by the eNB to measure $G_{eNB \to UE}^{general}$ and then computes $G_{UE \to eNB}^{general}$ as $$G_{UE \to eNB}^{general} = B_{TX}(B_{RX})^{-1} (G_{eNB \to UE}^{general})^T (A_{TX})^{-T} (A_{RX})^T.$$

In the second method, the vector input to the eNB array is multiplied by $A_{RX}(A_{TX})^{-1}$ when reference symbols are transmitted. The UE then measures the channel $A_{RX}(A_{TX})^{-1} G_{eNB \to UE}^{general}$ and thus there is no need to explicitly signal $(A_{TX})^{-T} (A_{RX})^T$ to the UE as this is incorporated in the channel measurement. As a result, the UE can compute the UE to eNB channel as $$G_{UE \to eNB}^{general} = B_{TX}(B_{RX})^{-1} (A_{RX}(A_{TX})^{-1} G_{eNB \to UE}^{general})^T.$$

Similarly, there are two methods that can be used to enable the eNB to learn $G_{eNB \to UE}^{general}$. In the first method, the UE signals the N×N matrix $(B_{TX})^{-T} (B_{RX})^T$ to the eNB. The eNB uses the reference symbols transmitted by the UE to measure $G_{UE \to eNB}^{general}$ and then computes $G_{eNB \to UE}^{general}$ as $$G_{eNB \to UE}^{general} = A_{TX}(A_{RX})^{-1} (G_{UE \to eNB}^{general})^T (B_{TX})^{-T} (B_{RX})^T.$$

In the second method, the vector input to the UE array is multiplied by $B_{RX}(B_{TX})^{-1}$ when reference symbols are transmitted. The eNB then measures the channel $$B_{RX}(B_{TX})^{-1} G_{UE \to eNB}^{general}$$

and thus there is no need to explicitly signal $B_{RX}(B_{TX})^{-1}$ to the eNB as this is incorporated in the channel measurement. As a result, the eNB can compute the eNB to UE channel as $$G_{UE \to eNB}^{general} = A_{TX}(A_{RX})^{-1} (B_{RX}(B_{TX})^{-1} G_{UE \to eNB}^{general})^T$$

Figure 7:
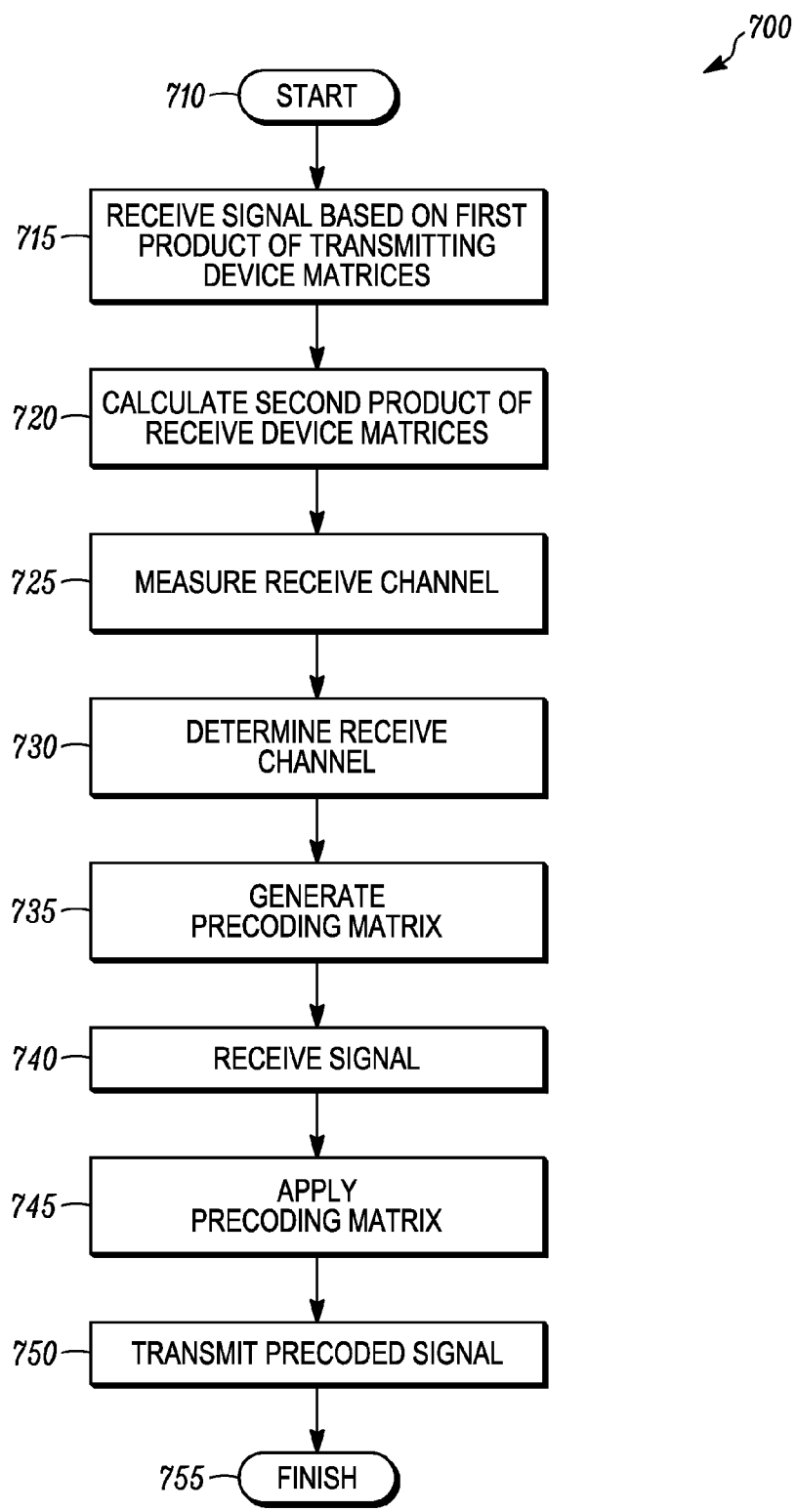
FIG. 7 is an example flowchart illustrating the operation of a receiving device according to a possible embodiment.

FIG. 7 is an example flowchart 700 illustrating the operation of a receiving device, such as the receiving device 110, according to a possible embodiment. At 710, the flowchart 700 can begin.

At 715, a signal based on a first product of an inverse transpose of a transmit coupling matrix of a transmitting device and a transpose of a receive coupling matrix of the transmitting device can be received at the receiving device. The transmit coupling matrix of the transmitting device can be based on a source impedance matrix of a transmitter at the transmitting device and an impedance matrix of an array of antennas at the transmitting device. The receive coupling matrix of the transmitting device can be based on a load impedance matrix of a receiver at the transmitting device and an impedance matrix of an array of antennas at the transmitting device. For example, the first product of a transpose inverse of a transmit coupling matrix of the transmitting device and a transpose receive coupling matrix of the transmitting device can be based on:

$$(Z_{UE\_Thev}+Z_{UE})^T(Z_{UE}+Z_{UE\_L})^{-T}Z_{UE\_L}^T \text{ or}$$

$$(Z_{UE\_Nor}^{-1}+Z_{UE}^{-1})^T Z_{UE}^T (Z_{UE}+Z_{UE\_L})^{-T} Z_{UE\_L}^T.$$

These examples reference a UE as the transmitting device, but can also apply to an eNB or other transmitting device.

The signal based on the first product can include data comprising the first product of the inverse transpose of the transmit coupling matrix of the transmitting device and a transpose of the receive coupling matrix of the transmitting device. For example, the transmitting device can send the first product as data. Alternately, the signal based on the first product can include reference symbols multiplied by a transpose of the first product of the transpose inverse of the transmit coupling matrix of the transmitting device and the transpose of the receive coupling matrix of the transmitting device.

At 720, a second product of a transmit coupling matrix of the receiving device and an inverse of a receive coupling matrix of the receiving device can be calculated. The transmit coupling matrix of the receiving device can be based on a source impedance matrix of a transmitter at the receiving device and an impedance matrix of an array of antennas at the receiving device. The receive coupling matrix of the receiving device can be based on a load impedance of a receiver at the receiving device and an impedance matrix of an array of antennas at the receiving device. At 725, a receive channel from the transmitting device to the receiving device using reference symbols transmitted by the transmitting device can be measured.

At 730, a reverse channel can be determined based on the signal and based on a third product of the second product and the measurement of the receive channel. The reverse channel can be determined based on a third product of the second product, the measurement of the receive channel, and the first product of the transpose inverse of the transmit coupling matrix of the transmitting device and the transpose of the receive coupling matrix of the transmitting device. For example, the transpose inverse of the first product of the transmit coupling matrix of the transmitting device and the transpose of the receive coupling matrix of the transmitting device can be determined at the transmitting device and sent as data to save bandwidth by not requiring data for both matrices. Alternately, the both matrices can be sent as data and the first product of the transpose inverse of the transmit coupling matrix of the transmitting device and the transpose of the receive coupling matrix of the transmitting device can be determined at the receiving device.

At 735, a precoding matrix can be generated based on the reverse channel. At 740, a signal can be received for transmission. The signal can be received from other elements in the receiving device. At 745, the precoding matrix can be applied to the signal to generate a precoded signal for transmission over a physical channel. At 750, the precoded signal based on the reverse channel can be transmitted. At 755, the flowchart 700 can end.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 8:
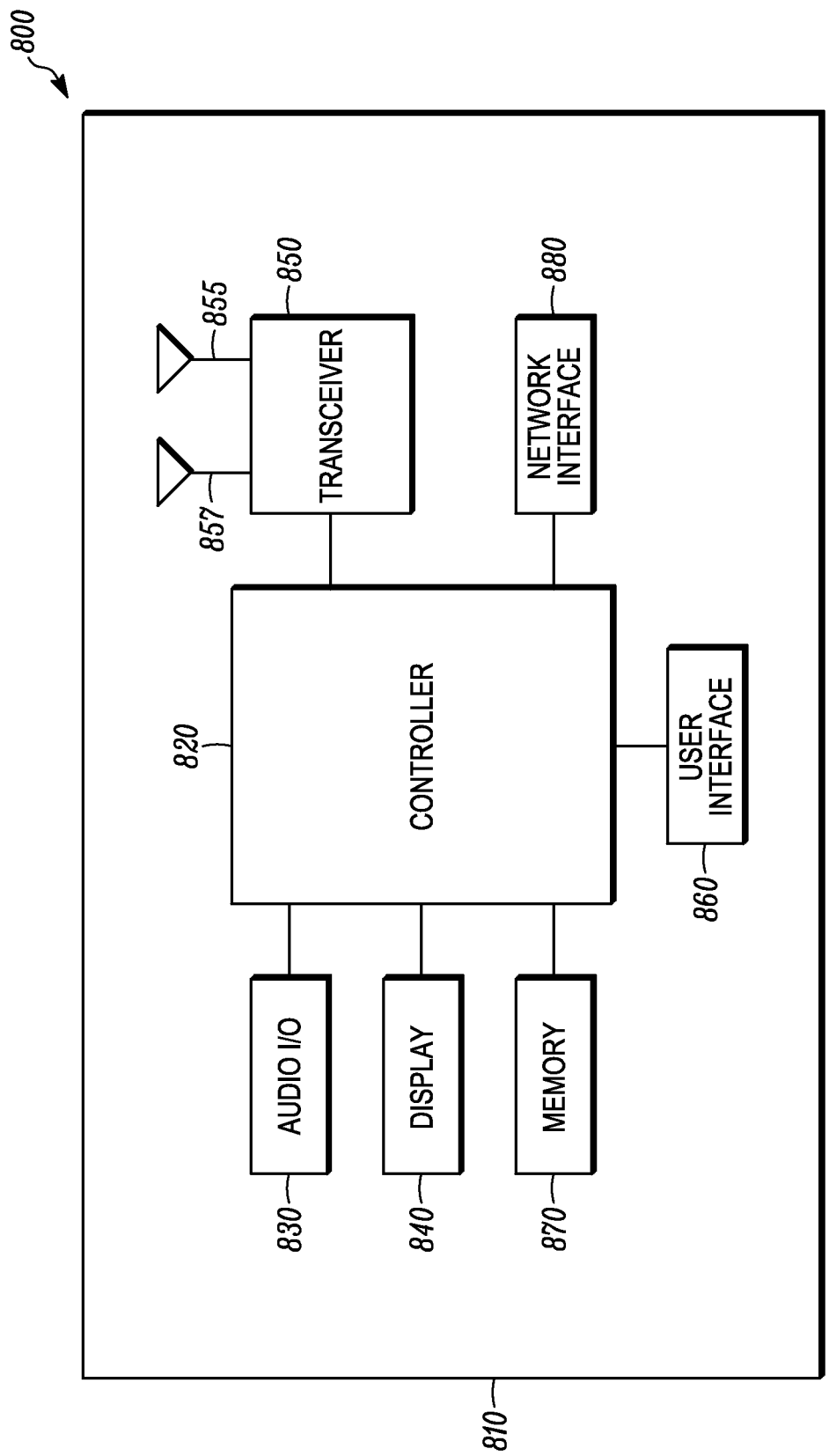
FIG. 8 is an example block diagram of an apparatus according to a possible embodiment.

FIG. 8 is an example block diagram of an apparatus 800, such as the device 110 or the device 120, according to a possible embodiment. The apparatus 800 can include a housing 810, a controller 820 within the housing 810, audio input and output circuitry 830 coupled to the controller 820, a display 840 coupled to the controller 820, a transceiver 850 coupled to the controller 820, a plurality of antennas 855 and 857, such as an array of antennas, coupled to the transceiver 850, a user interface 860 coupled to the controller 820, a memory 870 coupled to the controller 820, and a network interface 880 coupled to the controller 820. The apparatus 800 can also include additional elements or less elements depending on the device in which it is implemented. The apparatus 800 can perform the methods described in all the embodiments.

The display 840 can be a viewfinder, a liquid crystal display (LCD), a light emitting diode (LED) display, a plasma display, a projection display, a touch screen, or any other device that displays information. The transceiver 850 can include a transmitter and/or a receiver. The transceiver 850 can also include a plurality of transceivers with each transceiver coupled a corresponding antenna of the plurality of antennas 855 and 857. The audio input and output circuitry 830 can include a microphone, a speaker, a transducer, or any other audio input and output circuitry. The user interface 860 can include a keypad, a keyboard, buttons, a touch pad, a joystick, a touch screen display, another additional display, or any other device useful for providing an interface between a user and an electronic device. The network interface 880 can be a Universal Serial Bus (USB) port, an Ethernet port, an infrared transmitter/receiver, an IEEE 1398 port, a WLAN transceiver, or any other interface that can connect an apparatus to a network, device, or computer and that can transmit and receive data communication signals. The memory 870 can include a random access memory, a read only memory, an optical memory, a flash memory, a removable memory, a hard drive, a cache, or any other memory that can be coupled to a wireless communication device. The plurality of antennas 855 and 857 can be considered a transmitter array of antennas when the transceiver 850 is transmitting signals. The transmitter array of antennas 855 and 857 can include two or more antennas. The transmitter array of antennas 855 and 857 can be mutually coupled in that one of a voltage and current applied to one antenna element induces a voltage or current on another antenna element in the transmitter array of antennas 855 and 857.

The apparatus 800 or the controller 820 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 870 or elsewhere on the apparatus 800. The apparatus 800 or the controller 820 may also use hardware to implement disclosed operations. For example, the controller 820 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 820 may be any controller or processor device or devices capable of operating a communication device and implementing the disclosed embodiments.

In operation, the transceiver 850 can receive a signal based on a first product of an inverse transpose of a transmit coupling matrix of a transmitting device and a transpose of a receive coupling matrix of the transmitting device. The transmit coupling matrix of the transmitting device can be based on a source impedance matrix of a transmitter at the transmitting device and an impedance matrix of an array of antennas at the transmitting device. The receive coupling matrix of the transmitting device can be based on a load impedance of a receiver at the transmitting device and an impedance matrix of an array of antennas at the transmitting device. The signal can include data comprising the first product of the inverse transpose of the transmit coupling matrix of the transmitting device and a transpose of the receive coupling matrix of the transmitting device. The controller 820 can determine the determined receive channel based on a third product of the second product, the measurement of the receive channel, and the first product of the transpose inverse of the transmit coupling matrix of the transmitting device and the transpose of the receive coupling matrix of the transmitting device. The signal can also include reference symbols multiplied by a transpose of the first product of the transpose inverse of the transmit coupling matrix of the transmitting device and the transpose of the receive coupling matrix of the transmitting device.

The controller 820 can calculate a second product of a transmit coupling matrix of the apparatus 800 and an inverse of a receive coupling matrix of the apparatus 800. The transmit coupling matrix of the apparatus 800 and the receive coupling matrix of the apparatus 800 can be based on the plurality of antennas 855 and 857. The transmit coupling matrix of the apparatus 800 can be based on a source impedance matrix of a transmitter at the apparatus and an impedance matrix of the plurality of antennas at the apparatus. The receive coupling matrix of the apparatus 800 can be based on a load impedance of a receiver at the apparatus and an impedance matrix of the plurality of antennas at the apparatus.

The controller 820 can measure a receive channel from the transmitting device to the apparatus using reference symbols transmitted by the transmitting device. The controller 820 can determine a reverse channel based on the signal and based on a third product of the second product and the measurement of the receive channel.

The controller 820 can generate a precoding matrix based on the reverse channel, can receive a signal for transmission, and can apply the precoding matrix to the signal to generate a precoded signal for transmission over a physical channel. The transceiver 850 can transmit the precoded signal based on the reverse channel.

According to another possible embodiment, when the apparatus 800 is acting as a transmitting device, the controller 820 can calculate a first product of an inverse of a transmit coupling matrix of the apparatus 800 and a receive coupling matrix of the apparatus 800. The first product of the inverse of transmit coupling matrix of the apparatus 800 and the receive coupling matrix of the apparatus 800 can be determined as described in the above embodiments. The signal can be based on the first product can include data comprising the first product of the inverse of the transmit coupling matrix of the apparatus 800 and the receive coupling matrix of the apparatus 800. The signal based on the first product can also comprise reference symbols multiplied by a first product of the inverse of the transmit coupling matrix of the apparatus 800 and the receive coupling matrix of the apparatus 800. The transceiver 850 can then transmit the signal based on the first product of an inverse of the transmit coupling matrix of the apparatus 800 and the receive coupling matrix of the apparatus 800 to a receiving device.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" followed by a list is defined to mean one, some, or all, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

I claim:
1. A method comprising:
  receiving, at a receiving device, a signal based on a first product of an inverse of a transmit coupling matrix of a transmitting device and a receive coupling matrix of the transmitting device;

calculating a second product of a transmit coupling matrix of the receiving device and an inverse of a receive coupling matrix of the receiving device;

measuring, at the receiving device, a receive channel from the transmitting device to the receiving device using reference symbols transmitted by the transmitting device;

determining a reverse channel based on the signal, the second product, and the measurement of the receive channel; and transmitting a precoded signal based on the reverse channel.

2. The method according to claim 1, further comprising:
generating a precoding matrix based on the reverse channel;
receiving a signal for transmission; and
applying the precoding matrix to the signal to generate the precoded signal for transmission over a physical channel.

3. The method according to claim 1, wherein the signal based on the first product includes data comprising the first product of the inverse of the transmit coupling matrix of the transmitting device and the receive coupling matrix of the transmitting device.

4. The method according to claim 3, wherein determining comprises determining the reverse channel based on a third product of the second product, the transpose of the measurement of the receive channel, and the transpose of the first product of the inverse of the transmit coupling matrix of the transmitting device and the receive coupling matrix of the transmitting device.

5. The method according to claim 1, wherein the signal based on the first product comprises reference symbols multiplied by a first product of the inverse of the transmit coupling matrix of the transmitting device and the receive coupling matrix of the transmitting device and determining the reverse channel comprises multiplying the second product by the transpose of the channel measurements.

6. The method according to claim 1, wherein the transmit coupling matrix of the transmitting device is based on a source impedance matrix of a transmitter at the transmitting device and an impedance matrix of an array of antennas at the transmitting device.

7. The method according to claim 1, wherein the receive coupling matrix of the transmitting device is based on a load impedance of a receiver at the transmitting device and an impedance matrix of an array of antennas at the transmitting device.

8. The method according to claim 1, wherein the transmit coupling matrix of the receiving device is based on a source impedance matrix of a transmitter at the receiving device and an impedance matrix of an array of antennas at the receiving device.

9. The method according to claim 1, wherein the receive coupling matrix of the receiving device is based on a load impedance of a receiver at the receiving device and an impedance matrix of an array of antennas at the receiving device.

10. The method according to claim 1, wherein coupling matrix of the transmitting device is based on mutual coupling between antennas of the transmitting device.

11. The method according to claim 1, wherein a coupling matrix of the receiving device is based on mutual coupling between antennas of the receiving device.

12. An apparatus comprising:
a plurality of antennas;
a transceiver coupled to the plurality of antennas, the transceiver configured to receive a signal based on a first product of an inverse of a transmit coupling matrix of a transmitting device and a receive coupling matrix of the transmitting device; and
a controller configured to
calculate a second product of a transmit coupling matrix of the apparatus and an inverse of a receive coupling matrix of the apparatus,
measure, at the apparatus, a receive channel from the transmitting device to the apparatus using reference symbols transmitted by the transmitting device, and
determine a reverse channel based on the signal, the second product, and the measurement of the receive channel,
wherein the transceiver is configured to transmit a precoded signal based on the reverse channel.

13. The apparatus according to claim 12, wherein the controller is configured to generate a precoding matrix based on the reverse channel, configured to receive a signal for transmission, and configured to apply the precoding matrix to the signal to generate the precoded signal for transmission over a physical channel.

14. The apparatus according to claim 12, wherein the signal based on the first product includes data comprising the first product of the inverse of the transmit coupling matrix of the transmitting device and the receive coupling matrix of the transmitting device.

15. The apparatus according to claim 14, wherein the controller is configured to determine the reverse channel based on a third product of the second product, the transpose of the measurement of the receive channel, and the transpose of the first product of the inverse of the transmit coupling matrix of the transmitting device and the receive coupling matrix of the transmitting device.

16. The apparatus according to claim 12, wherein the signal based on the first product comprises reference symbols multiplied by the first product of the inverse of the transmit coupling matrix of the transmitting device and the of the receive coupling matrix of the transmitting device.

17. The apparatus according to claim 12, wherein the transmit coupling matrix of the transmitting device is based on a source impedance matrix of a transmitter at the transmitting device and an impedance matrix of an array of antennas at the transmitting device.

18. The apparatus according to claim 12, wherein the receive coupling matrix of the transmitting device is based on a load impedance of a receiver at the transmitting device and an impedance matrix of an array of antennas at the transmitting device.

19. The apparatus according to claim 12, wherein the transmit coupling matrix of the apparatus and the receive coupling matrix of the apparatus are based on the plurality of antennas.

20. The apparatus according to claim 12, wherein the transmit coupling matrix of the apparatus is based on a source impedance matrix of a transmitter at the apparatus and an impedance matrix of the plurality of antennas at the apparatus.

21. The apparatus according to claim 12, wherein the receive coupling matrix of the apparatus is based on a load impedance of a receiver at the apparatus and an impedance matrix of the plurality of antennas at the apparatus.

22. A method comprising:
    calculating, at a transmitting device, a first product of an inverse of a transmit coupling matrix of the transmitting device and a receive coupling matrix of the transmitting device;
    generating a signal based on the first products of an inverse of a transmit coupling matrix of the transmitting device and the receive coupling matrix of the transmitting device; and
    transmitting, to a receiving device, the signal based on the first product of the inverse of the transmit coupling matrix of the transmitting device and the receive coupling matrix of the transmitting device.

23. The method according to claim 22, wherein the signal based on the first product includes data comprising the first product of the inverse of the transmit coupling matrix of the transmitting device and the receive coupling matrix of the transmitting device.

24. The method according to claim 22, wherein the signal based on the first product comprises reference symbols multiplied by a first product of the inverse of the transmit coupling matrix of the transmitting device and the receive coupling matrix of the transmitting device.

25. The method according to claim 22, further comprising receiving, from the receiving device, a precoded signal based on a reverse channel, where the reverse channel is based on a second product of a transmit coupling matrix of the receiving device and an inverse of a receive coupling matrix of the receiving device, based on the transmitted signal, and based on a receive channel from the transmitting device to the receiving device using reference symbols transmitted by the transmitting device.

26. An apparatus comprising:
    a controller that calculates a first product of an inverse of a transmit coupling matrix of the apparatus and a receive coupling matrix of the apparatus and generates a signal based on the first product of the inverse of the transmit coupling matrix of the apparatus and the receive coupling matrix of the apparatus; and
    a transceiver that transmits, to a receiving device, the signal based on the first product of an inverse of a transmit coupling matrix of the apparatus and the receive coupling matrix of the apparatus.

27. The apparatus according to claim 26, wherein the signal based on the first product includes data comprising the first product of the inverse of the transmit coupling matrix of the apparatus and the receive coupling matrix of the apparatus.

28. The apparatus according to claim 26, wherein the signal based on the first product comprises reference symbols multiplied by a first product of the inverse of the transmit coupling matrix of the apparatus and the receive coupling matrix of the apparatus.

29. The apparatus according to claim 26, wherein the transceiver receives, from the receiving device, a precoded signal based on a reverse channel, where the reverse channel is based on a second product of a transmit coupling matrix of the receiving device and an inverse of a receive coupling matrix of the receiving device, based on the transmitted signal, and based on a receive channel from the transmitting device to the receiving device using reference symbols transmitted by the transmitting device.

* * * * *